United States Patent
Hu et al.

(10) Patent No.: US 12,375,975 B2
(45) Date of Patent: Jul. 29, 2025

(54) METHOD OF LOAD FORECASTING VIA KNOWLEDGE DISTILLATION, AND AN APPARATUS FOR THE SAME

(71) Applicant: SAMSUNG ELECTRONICS CO., LTD., Suwon-si (KR)

(72) Inventors: Chengming Hu, Montreal (CA); Xi Chen, Montreal (CA); Amal Feriani, Winnipeg (CA); Ju Wang, Brossard (CA); Jikun Kang, Montreal (CA); Xue Liu, Montreal (CA); Gregory Lewis Dudek, Westmount (CA); Seowoo Jang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 418 days.

(21) Appl. No.: 17/902,626

(22) Filed: Sep. 2, 2022

(65) Prior Publication Data
US 2023/0102489 A1 Mar. 30, 2023

Related U.S. Application Data

(60) Provisional application No. 63/241,468, filed on Sep. 7, 2021.

(51) Int. Cl.
*H04W 28/16* (2009.01)
*G06N 20/00* (2019.01)
(Continued)

(52) U.S. Cl.
CPC ............ *H04W 28/16* (2013.01); *G06N 20/00* (2019.01); *H04L 41/16* (2013.01); *H04W 24/02* (2013.01); *H04W 28/08* (2013.01)

(58) Field of Classification Search
CPC ................................ H04L 41/16; G06N 20/00
See application file for complete search history.

(56) References Cited

U.S. PATENT DOCUMENTS 9,432,901 B1 * 8/2016 Kwan ................... H04L 41/147
2021/0150407 A1 5/2021 Xu et al.
(Continued)

FOREIGN PATENT DOCUMENTS

CN 111369042 B 9/2021
WO 2017/000557 A1 1/2017
(Continued)

OTHER PUBLICATIONS

Kaiwen He et al., "Graph Attention Spatial-Temporal Network With Collaborative Global-Local Learning for Citywide Mobile Traffic Prediction", IEEE Transactions on Mobile Computing, vol. 21, No. 4, Apr. 2022, pp. 1244-1256, DOI: 10.1109/TMC.2020.3020582.
(Continued)

*Primary Examiner* — Jamaal Henson
(74) *Attorney, Agent, or Firm* — Sughrue Mion, PLLC

(57) ABSTRACT

A server may obtain teacher artificial intelligence (AI) models from source base stations; obtain target traffic data from a target base station; obtain an integrated teacher prediction based on the target traffic data by integrating teacher prediction results of the teacher AI models based on teacher importance weights; obtain a student AI model that is trained to converge a student loss on the target traffic data; update the teacher importance weights to converge a teacher loss between a student prediction of the student AI model on the target traffic data, and the integrated teacher prediction of the teacher AI models on the target traffic data; update the student AI model based on the updated teacher importance weights being applied to the teacher prediction results of the teacher AI models; and predict a communication traffic load of the target base station using the updated student AI model.

20 Claims, 12 Drawing Sheets

(51) Int. Cl.
*H04L 41/16* (2022.01)
*H04W 24/02* (2009.01)
*H04W 28/08* (2023.01)

(56) References Cited

U.S. PATENT DOCUMENTS

| | | | |
|---|---|---|---|
| 2021/0224660 A1 | 7/2021 | Song et al. | |
| 2021/0377801 A1* | 12/2021 | Noriega | H04W 88/14 |
| 2022/0012637 A1 | 1/2022 | Rezazadegan Tavakoli et al. | |
| 2022/0053375 A1* | 2/2022 | Asawa | H04W 72/0453 |
| 2022/0116823 A1* | 4/2022 | Choi | H04L 47/83 |
| 2022/0330090 A1* | 10/2022 | Han | G06N 20/20 |
| 2023/0325711 A1* | 10/2023 | Haraldson | G06N 3/084 |
| | | | 706/12 |
| 2024/0040501 A1* | 2/2024 | Yuan | H04W 16/18 |

FOREIGN PATENT DOCUMENTS

| | | | |
|---|---|---|---|
| WO | 2021/169577 A1 | 9/2021 | |
| WO | 2022/032642 A1 | 2/2022 | |

OTHER PUBLICATIONS

Jiasi Chen et al., "Deep Learning With Edge Computing: A Review," Proceedings of the IEEE, vol. 107, No. 8, Aug. 2019, pp. 1655-1674, DOI: 10.1109/JPROC.2019.2921977.
Shan You et al., "Learning from Multiple Teacher Networks", Proceedings of the 23rd ACM SIGKDD International Conference on Knowledge Discovery and Data Mining, Aug. 4, 2017, pp. 1285-1294, https://doi.org/10.1145/3097983.3098135, (11 pages total).
Yoonho Boo et al., "Stochastic Precision Ensemble: Self-Knowledge Distillation for Quantized Deep Neural Networks", Proceedings of the AAAI Conference on Artificial Intelligence, vol. 35 No. 8: AAAI-21 Technical Tracks 8, May 18, 2021, https://doi.org/10.1609/aaai.v35i8.16839, (10 pages total).
Ye Lin et al., "Weight Distillation: Transferring the Knowledge in Neural Network Parameters", Proceedings of the 59th Annual Meeting of the Association for Computational Linguistics and the 11th International Joint Conference on Natural Language Processing, Jul. 19, 2021, https://arxiv.org/abs/2009.09152, (14 pages total).
International Search Report (PCT/ISA/220 and PCT/ISA/210) and Written Opinion (PCT/ISA/237) dated Dec. 9, 2022 issued by the International Searching Authority in International Application No. PCT/KR2022/013453.
Qian Bin et al., "Orchestrating the Development Lifecycle of Machine Learning-Based IoT Applications: A Taxonomy and Survey", arXiv:1910.05433v5 [cs. DC], May 29, 2020, 56 pages, https://www.statista.com/statistics/471264/iot-number-of-connected-devices-worldwide/.
European Extended Search Report issued Jul. 29, 2024 by the European Patent Office for EP Patent Application No. 22867700.1.

* cited by examiner

METHOD OF LOAD FORECASTING VIA KNOWLEDGE DISTILLATION, AND AN APPARATUS FOR THE SAME

CROSS-REFERENCE TO RELATED APPLICATION(S)

This application is based on and claims priority under 35 U.S.C. § 119 to U.S. Provisional Patent Application No. 63/241,468, filed on Sep. 7, 2021 in the U.S. Patent & Trademark Office, the disclosure of which is incorporated by reference herein in its entirety.

BACKGROUND

1. Field

The disclosure relates to a method of load forecasting via knowledge distillation, and an apparatus for the same, and more particularly to a method for forecasting communication load by weighting multiple teacher models in knowledge distillation via bi-level optimization, and an apparatus for the same.

2. Description of Related Art

For many real-world applications for load forecasting, it is difficult to collect enough training data for a particular domain of interest, which is referred to as a target domain. Meanwhile, a large amount of training data may be available on some related domains, which are referred to as source domains. Transfer learning aims to improve the learning performance in the target domain by utilizing knowledge from both the target domain and the source domains. Transfer learning has shown to be an effective approach for several real-world applications including communication traffic patterns, image classification, energy management, and indoor WiFi localization.

Communication traffic forecasting is essential for the performance of a mobile communication system, such as a fifth-generation (5G) or a sixth-generation (6G) mobile communication system. Depending on the forecasting horizon, load forecasting ranges from short-term (hours or minutes ahead) to long-term (years ahead). Short-Term Load Forecasting (STLF) is mainly used to assist real-time communication traffic forecasting, connection density forecasting, peak data rate forecasting, system key performance indicators (KIPs) forecasting, and user behavior forecasting while long-term load forecasting is mainly applied for communication infrastructure planning. Accurate short-term load forecasting can facilitate efficient resource allocation and traffic distribution between base stations. In the real world, since communication traffic patterns dynamically change in real time and each base station has limited resources, it is of critical importance to deploy resources as close to the actual demand as possible to maintain the system performance and also to avoid waste of resources.

Computing and actuation delays widely exist in the Operation, Administration, and Management (OAM) plane of wireless communication systems, such as a fifth-generation (5G) wireless communication system and a sixth-generation (6G) wireless communication system. These delays could cause potentially large system performance degradation. Due to real-world constraints, such as the limited bandwidth between sensors and servers, and the finite speed of processors, it may be difficult to eliminate delays. To overcome such delays, forecasting of key system characteristics, such as the communication load, is crucial in supporting system functionalities.

Recently, neural network (NN) based approaches has shown its effectiveness on enhancing load forecasting with its strong capacity to learn from the spatial-temporal communication system data. Most existing NN models are purely trained on the data stored in a single target base station. However, the data amount in one BS can be far from enough to build an accurate and robust NN model, resulting in potentially large forecasting errors. One possible solution is to aggregate the data from multiple base stations and to train a forecasting model on these newly aggregated data. However, data aggregation could bring large bandwidth costs and increase demands on backhaul resources.

Accordingly, there is a need for a new NN model that resolves the bandwidth-limited issue and reduces the computing and actuation delays.

SUMMARY

Example embodiments address at least the above problems and/or disadvantages and other disadvantages not described above. Also, the example embodiments are not required to overcome the disadvantages described above, and may not overcome any of the problems described above.

According to an aspect of the disclosure, a server for predicting future load may include: at least one memory storing computer-readable instructions; and at least one processor configured to execute the computer-readable instructions to: obtain a plurality of teacher artificial intelligence (AI) models that are trained based on source traffic data from a plurality of source base stations; obtain target traffic data from a target base station; obtain an integrated teacher prediction based on the target traffic data by integrating teacher prediction results of the plurality of teacher AI models based on teacher importance weights; obtain a student AI model that is trained to converge a student loss including a distillation knowledge loss and a ground-truth loss on the target traffic data; update the teacher importance weights to converge a teacher loss between a student prediction of the student AI model on the target traffic data, and the integrated teacher prediction of the plurality of teacher AI models on the target traffic data; update the student AI model based on the updated teacher importance weights being applied to the teacher prediction results of the plurality of teacher AI models; and predict a communication traffic load of the target base station using the updated student AI model.

The at least one processor may be further configured to: split the target traffic data into a training data set and a validation data set; obtain the distillation knowledge loss and the ground-truth loss based on the training data set of the target traffic data; and obtain the student prediction of the student AI model and the integrated teacher prediction of the plurality of teacher AI models based on the validation data set of the target traffic data to update the teacher importance weights.

The at least one processor may be further configured to: iteratively update the student AI model and the teacher importance weights until the student loss of the student AI model converges to a constant value.

The at least one processor may be further configured to compute a mean absolute error of the student AI model as the student loss.

The at least one processor may be further configured to compute the distillation knowledge loss of the student AI model based on a difference between the integrated teacher prediction and the student prediction of the student AI model on the target traffic data, and compute the ground-truth loss of the student AI model based on a difference between the student prediction of the student AI model on the target traffic data and a ground-truth traffic load.

The at least one processor may be further configured to: determine whether a prediction accuracy on a further traffic load of the target base station over a present past time window, is lower than an accuracy threshold; and in response to determining that the prediction accuracy is lower than the accuracy threshold, start to collect the target traffic data from the target base station, and train the student AI model based on the integrated teacher prediction of the plurality of teacher AI models.

The at least one processor may be further configured to: split the target traffic data into a training data set and a validation data set; and at each iteration, update the teacher importance weights and the student AI model via gradient descent to minimize the teacher loss on the validation data set and the student loss on the training data set, respectively.

The at least one processor may be further configured to: adjust a spectrum allocated to the target base station based on the predicted communication traffic load of the target base station.

According to another aspect of the present disclosure, a method for predicting future load may include: obtaining a plurality of teacher artificial intelligence (AI) models that are trained based on source traffic data from a plurality of source base stations; obtaining target traffic data from a target base station; obtaining an integrated teacher prediction based on the target traffic data by integrating teacher prediction results of the plurality of teacher AI models based on teacher importance weights; obtaining a student AI model that is trained to converge a student loss including a distillation knowledge loss and a ground-truth loss on the target traffic data; updating the teacher importance weights to converge a teacher loss between a student prediction of the student AI model on the target traffic data, and the integrated teacher prediction of the plurality of teacher AI models on the target traffic data; updating the student AI model based on the updated teacher importance weights being applied to the teacher prediction results of the plurality of teacher AI models; and predicting a communication traffic load of the target base station using the updated student AI model.

The method may further include: splitting the target traffic data into a training data set and a validation data set; obtaining the distillation knowledge loss and the ground-truth loss based on the training data set of the target traffic data; and obtaining the student prediction of the student AI model and the integrated teacher prediction of the plurality of teacher AI models based on the validation data set of the target traffic data to update the teacher importance weights.

The method may further include: iteratively updating the student AI model and the teacher importance weights until the student loss of the student AI model converges to a constant value.

The method may further include: computing a mean absolute error of the student AI model as the student loss.

The method may further include: computing the distillation knowledge loss of the student AI model based on a difference between the integrated teacher prediction and the student prediction of the student AI model on the target traffic data; and computing the ground-truth loss of the student AI model based on a difference between the student prediction of the student AI model on the target traffic data and a ground-truth traffic load.

The method may further include: determining whether a prediction accuracy on a further traffic load of the target base station over a present past time window, is lower than an accuracy threshold; and in response to determining that the prediction accuracy is lower than the accuracy threshold, starting to collect the target traffic data from the target base station, and train the student AI model based on the integrated teacher prediction of the plurality of teacher AI models.

The method may further include: splitting the target traffic data into a training data set and a validation data set; and at each iteration, updating the teacher importance weights and the student AI model via gradient descent to minimize the teacher loss on the validation data set and the student loss on the training data set, respectively.

The method may further include: adjusting a spectrum allocated to the target base station based on the predicted communication traffic load of the target base station.

According to another aspect of the disclosure, a non-transitory computer-readable storage medium storing instructions which, when executed by at least one processor, causes the at least one processor to perform the method for predicting future load is provided.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
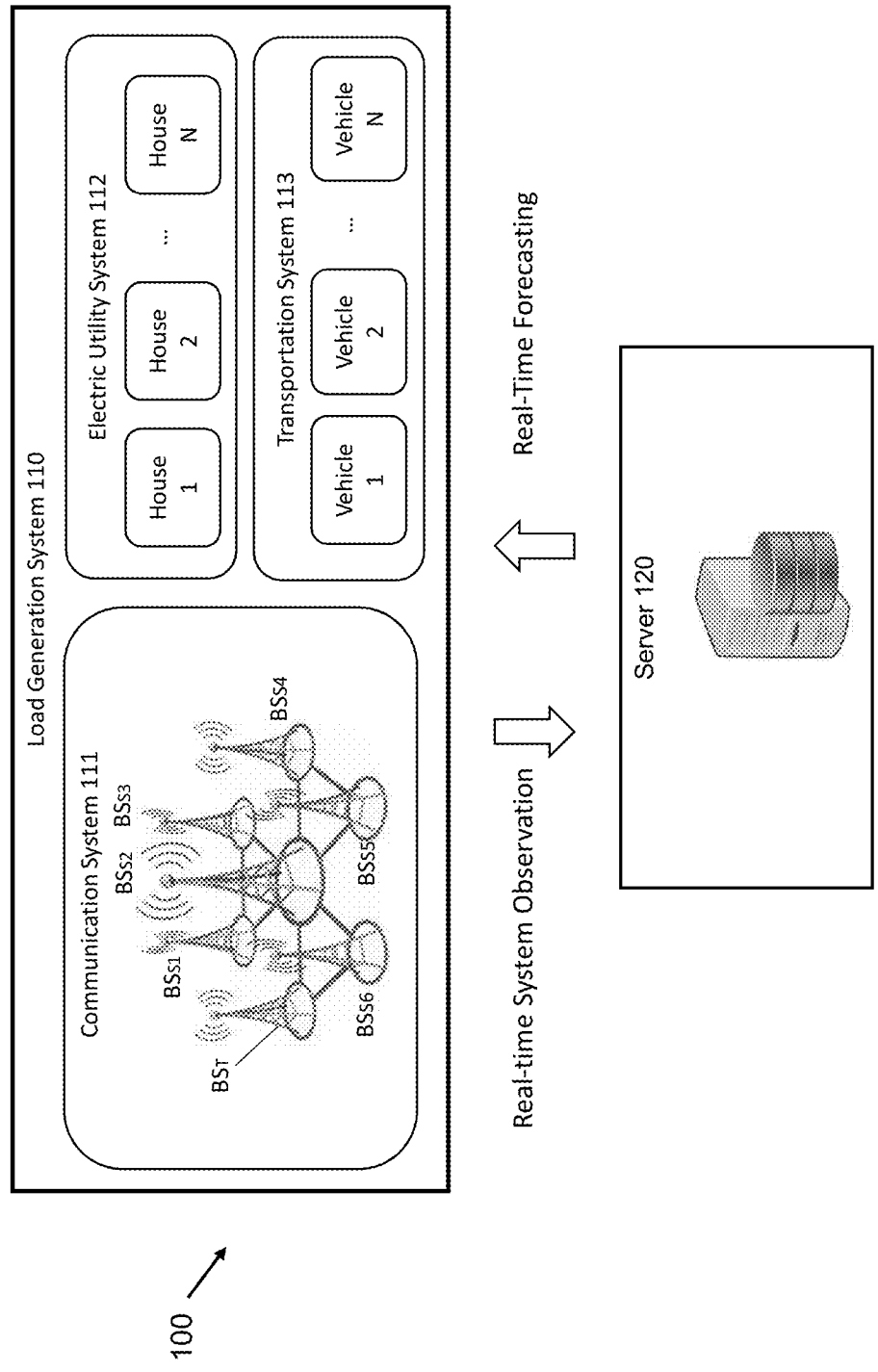
FIG. 1 is a diagram showing a general overview of a system for predicting future loads according to embodiments.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Figure 2:
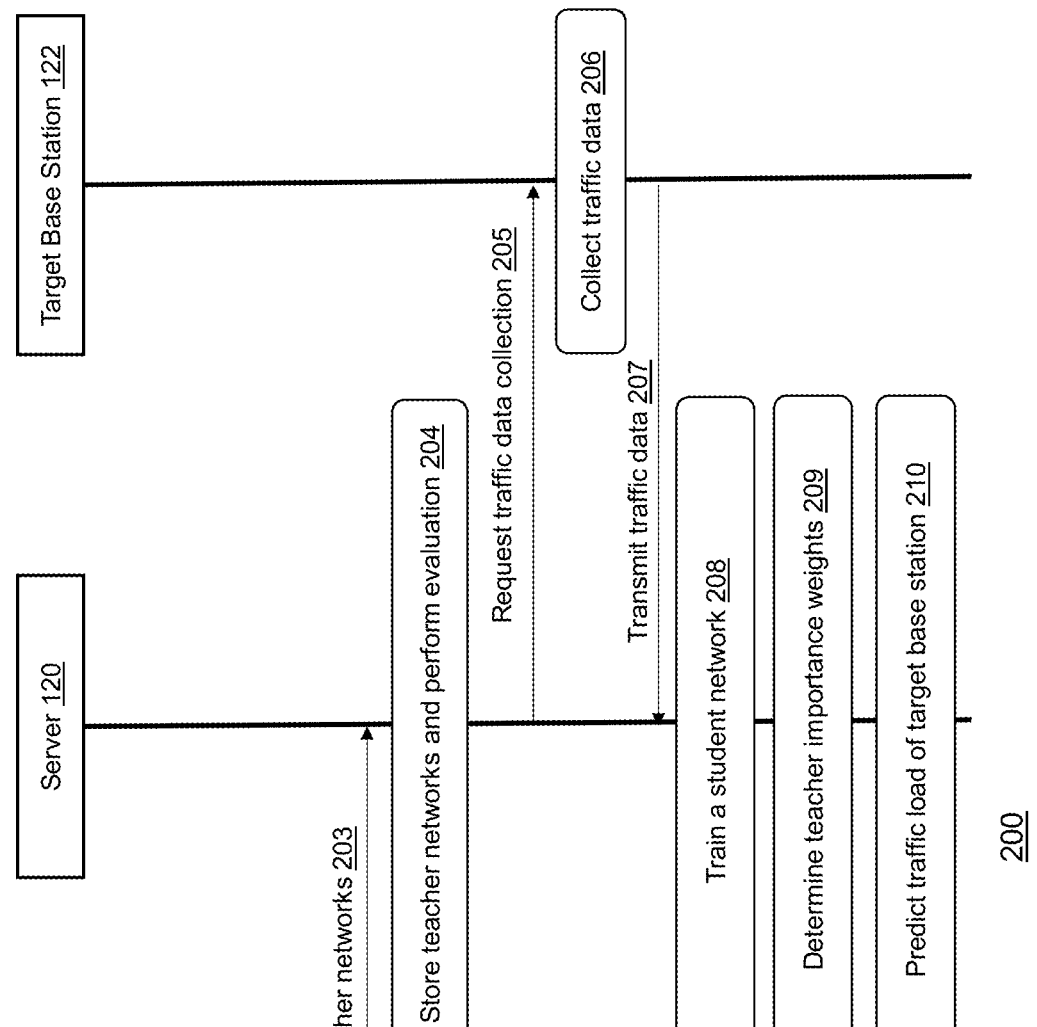
FIG. 2 illustrates a method of predicting a traffic load of a target base station via communication between source base stations, a server, and the target base station according to embodiments.

FIG. 1 is a diagram showing a general overview of a system 100 for predicting future loads according to embodiments. FIG. 2 illustrates a method 200 of predicting a future load via the system 100 according to embodiments. The system 100 and the method 200 may be used to forecast any type of load having corresponding information that can be used to predict a future load, and is not limited to the specific example embodiments discussed herein. For example, the system 100 and the method 200 can be used to predict electric loads, communication system traffic loads, transportation traffic loads, and the like.

The system 100 may include a load generation system 110 and a server 120. The load generation system 110 may refer to a communication system 111, an electric utility system 112, or a transportation systems 113, but the embodiments of the present disclosure are not limited thereto.

The communication system 111 may include a plurality of base stations $BS_T$ and $BS_{S1}$-$BS_{S6}$, which communicate with the server 120. Among the plurality of base stations $BS_T$ and $BS_{S1}$-$BS_{S6}$, the base station $BS_T$ may be referred to as a target base station $BS_T$, and the base stations $BS_{S1}$-$BS_{S6}$ may be referred to as source base stations $BS_{S1}$-$BS_{S6}$ which provide source data for predicting a future communication load of the target base station $BS_T$. The plurality of base stations $BS_T$ and $BS_{S1}$-$BS_{S6}$ may transmit real-time system observation results to the server 120, and the server 120 may predict a future load of the target base station $BS_T$ based on the real-time system observation results.

The server 120 may receive the real-time system observation data from the communication system 111. The real-time system observation data may include information of a communication system state, such as a number of active user equipment (UEs) in each cell, a cell load ratio, an internet protocol (IP) throughout per cell, and a cell physical resource block (PRB) usage ratio.

The server 120 may be implemented as a single server configured to receive traffic data from the plurality of base stations $BS_T$ and $BS_{S1}$-$BS_{S6}$, and predict a future communication load of each of the plurality of base stations $BS_T$ and $BS_{S1}$-$BS_{S6}$. Alternatively, the server 120 may be implemented as a plurality of servers, wherein each of the plurality of servers predicts a future communication load of a corresponding one of the plurality of base stations $BS_T$ and $BS_{S1}$-$BS_{S6}$. For example, a target base station server $S_T$ configured to predict the future communication load of the target base station $BS_T$ may receive traffic data from the target base station $BS_T$ and may also receive source predictions models $N_{s1}$-$N_{s6}$ from source base station servers $S_{s1}$-$S_{s6}$. The target base station server $S_T$ may predict the future communication load of the target base station $BS_T$ via a target source model $N_T$ by training the target source model $N_T$ using prediction results of the source predictions models $N_{s1}$-$N_{s6}$. The server 120 may correspond to the target base station server $S_T$, or a combination of target base station server $S_T$ and the source predictions models $N_{s1}$-$N_{s6}$.

According to embodiments, the server 120 may obtain teacher artificial intelligence (AI) models from source base stations, obtain target traffic data from a target base station obtain an integrated teacher prediction based on the target traffic data by integrating teacher prediction results of the teacher AI models based on teacher importance weights, obtain a student AI model that is trained to converge a student loss on the target traffic data, update the teacher importance weights to converge a teacher loss between a student prediction of the student AI model on the target traffic data, and the integrated teacher prediction of the teacher AI models on the target traffic data, update the student AI model based on the updated teacher importance weights being applied to the teacher prediction results of the teacher AI models, and predict a communication traffic load of the target base station using the updated student AI model. In particular, the student AI model may be trained to converge the student loss including a knowledge distillation loss and a ground truth loss, wherein the knowledge distillation loss may denote a difference between the integrated teacher prediction and the student prediction of the student AI model on the target traffic data. The ground truth loss may denote a difference between the student prediction of the student AI model and a ground-truth traffic load on the target traffic data.

The electric utility system 112 may include house 1 through house N that consume electricity, and the server 120 may obtain historical time sequence data from each of the houses 1-N. One of the house 1-N may be a target house, and the rest of the houses may be source houses that provide historical time sequence data to the server 120. The server 120 may predict a future electric load of the target house via a target model by transferring knowledge from source models to the target model, wherein the source models are trained based on the historical time sequence data of the source houses. The target house may be a newly built house and the server 120 may not have collected sufficient historical electric load consumption data from the target house itself. The server 120 may input the historical time sequence data of the target house to the source models to obtain prediction results of the source models, and to predict a future electric load of the target house via the target model that is trained based on the prediction results of the source models. For example, the historical time sequence data may include electric load consumption data, temperature data, weather data, and the day of the week (e.g., weekday or weekend) corresponding to the houses 1-N. The historical time sequence data are not limited to the above examples, and may include other type of data that may be indicative of future electric load.

The transportation systems 113 may include vehicle 1 through vehicle N that causes roadway traffic. One of the vehicles 1-N may be a target vehicle, and the rest of the vehicles may be source vehicles that provide historical traffic patterns to the server 120. The server 120 may predict a future transportation traffic load caused by the target vehicle, based on knowledge from source models that are trained using the historical traffic patterns of the source vehicles, in addition to the historical traffic pattern of the target vehicle.

For the sake of explanation, the following description will discuss an embodiment that predicts a communication traffic load of a target base station.

In embodiments of the present disclosure, a plurality of teacher models (instead of source data from source base stations) are aggregated via multi-teach knowledge distillation to create a student forecasting model that predicts a future traffic load of a target base station. A model aggregation according to an embodiment may address a limited bandwidth issue of data aggregation. Every base station, including source base stations and a target base station, learns a forecasting network on its own local data. For a single base station, it considers itself as a forecasting target and treats its reachable neighboring base stations as source base stations. A target base station collects trained artificial intelligence (AI) models (e.g., neural network models) from the source base stations and uses the AI models as teacher networks. For these teacher networks, a new student network for the target base station is trained via a knowledge distillation (KD) process to minimize or converge a regression loss between a prediction of the student network and a ground-truth value, and a KD loss between the prediction of the student network and predictions of the teacher network.

In embodiments of the present disclosure, knowledge (e.g., teacher predictions) distilled from the plurality of teacher networks are integrated with teacher importance weights that are adaptively adjusted to learn more from similar source base stations to improve the forecasting accuracy of the student network.

Due to heterogeneity among various base stations, the data distributions of the base stations may be diverse, and the distilled knowledge from various teachers could contribute differently to the performance of the student network. The student network may be trained to learn more from similar source base stations to improve the forecasting accuracy, while generalizing itself for a more robust performance by learning from dissimilar base stations.

In order to effectively distill the diverse knowledge from multiple teacher networks, one or more embodiments of the present disclosure provide an adaptive teacher importance weighting method. For a lower level optimization, the student network may be updated based on a first data set (e.g., a training data set) that is collected from the target base station. In an upper level, given the update student network at each iteration, the teacher importance weights are simultaneously optimized via one-step gradient descent to minimize or converge the knowledge distillation loss on a second data set (e.g., a validation data set) that is collected from the target base station. Through multiple iterations, critical teacher networks are assigned greater teacher importance weights to provide more knowledge for building the student network, which boosts the communication load forecasting performance on the target base station.

FIG. 2 illustrates a method 200 of predicting a traffic load of a target base 120 station via communication between source base stations 121, a server 120, and the target base station 120 according to embodiments. The server 120 may predict a future traffic load of the target base station 120 via a student network, based on teacher networks 202 provided from the source base stations 121, and traffic data collected from the target base station 120.

In operation 201, each of a plurality of source base stations 121 may collect source traffic data. For example, each source base station $BS_{S1}$-$BS_{S6}$ may collect its own source traffic data $D_{S1}$-$D_{S6}$ every preset time (e.g., every 15 minutes), and each source traffic data $D_{S1}$-$D_{S6}$ may include a communication load and time information (e.g., date and hour).

In operation 202, a plurality of source base stations 121 may train a plurality of teacher networks based on the collected source traffic data. For example, teacher networks T1-T6 may be provided to predict a traffic load of each source base station $BS_{S1}$-$BS_{S6}$, and each teacher network T1-T6 may be trained using a corresponding one of the source traffic data $D_{S1}$-$D_{S6}$. In particular, the teacher network T1 may be trained to predict the traffic load of the source base station $BS_{S1}$ based on the source traffic data $D_{S1}$, the teacher network T2 may be trained to predict the traffic load of the source base station $BS_{S2}$ based on the source traffic data $D_{S2}$, and the teacher network T3 may be trained to predict the traffic load of the source base station $BS_{S3}$ based on the source traffic data $D_{S3}$.

Operation 202 may be performed by each of a plurality of servers that are included in the plurality of source base stations 121, or that are provided separately from the plurality of source base stations 121. The plurality of servers may include the plurality of teacher networks, respectively.

In operation 203, the source base stations 121 (or the servers including the trained teacher networks) may transmit the trained teacher networks to the server 120. In an embodiment of the disclosure, the source base stations 121 may not transmit the traffic data collected by the source base stations 121, to the server 120, but may transmit only the trained teacher networks, to save the communication bandwidths between the source base stations 121 (or the servers including the trained teacher networks) and the server 120, and to save the memory storage of the server 120. However, the embodiment is not limited thereto, and the source base stations 121 may transmit both the collected traffic data and the trained teacher network. Also, in an embodiment, the training process of the teacher networks and the student network may be performed in the same server 120, and in such a case, operation 203 may be omitted.

In operation 204, the server 120 may receive the teacher networks, and may evaluate a prediction accuracy of the student network. In particular, the server 120 may compute a student loss of the student network that may include a distillation loss between prediction results of the teacher networks and a prediction result of the student network, and a ground-truth loss between the prediction result of the student network and a ground-truth traffic load of the target base station, and may determine the prediction accuracy of the student network based on the distillation loss and the ground-truth loss.

When the server 120 determines that the prediction accuracy of the student network does not meet a preset minimum performance of the student network, the server 120 may request the target base station 122 to collect traffic data in operation 206 so that the server 120 trains the student network based on the traffic data collected from the target base station 122 and thereby to reduce the student loss to a preset threshold (e.g., a range from 0 to 0.1).

In response to the data collection request being received from the server 120, the target base station 122 may transmit the collected traffic data to the server 120 in operation 207. Upon receipt of the traffic data, the server 120 may split the traffic data into a training data set $D_{train}$ and a validation data set $D_{valid}$ to train the student network and to validate the trained student network, respectively.

In operation 208, the server 120 may train the student network based on the training data set $D_{train}$. The student network is trained by minimizing a student loss on the training data set $D_{train}$, wherein the student loss may represent a sum of a distillation loss on the training data set $D_{train}$ between prediction results of the teacher networks and a prediction result of the student network, and a ground-truth loss on the training data set $D_{train}$ between the prediction result of the student network and a ground-truth traffic load of the target base station. The server 120 may determine the prediction accuracy of the student network based on the distillation loss and the ground-truth loss.

In operation 209, the server 120 may determine optimal teacher importance weights to be applied in integrating the prediction results of the teacher networks by minimizing or converging a teacher loss on the validation data set $D_{valid}$. The teacher loss may represent a distillation loss between a weighted sum of teacher predictions based on current teacher importance weights, and a prediction of the student network on the validation data set $D_{valid}$, which is trained by minimizing the student loss on the training data set $D_{train}$. When the prediction of the student network is used for updating the teacher importance weights, the student network receives as input the validation data set $D_{valid}$ to perform the prediction. On the other hand, when the prediction of the student network is used for updating the student network, the student network receives as input the training data set $D_{train}$ to perform the prediction.

In operation 210, the server 120 may predict the future traffic load of the target base station 122 using the trained student network. For example, the server 120 may determine to complete the training process of the student network when a prediction performance of the student network converges or reaches the preset minimum performance, and after the training process is completed, the server predicts the future traffic load of the target base station 122 using the trained student network. The server 120 may determine that the prediction performance of the student network converges when the student loss does not reduce any longer during an iterative training process, and therefore the student loss has a constant value. The server 120 may determine that the student loss has a constant value when the student loss stays exactly the same value (e.g., x) during an iterative training process, and also when a variation of the student loss is within a preset range of a constant value (e.g., a range from x−0.01x to x+0.01x).

Figure 3:
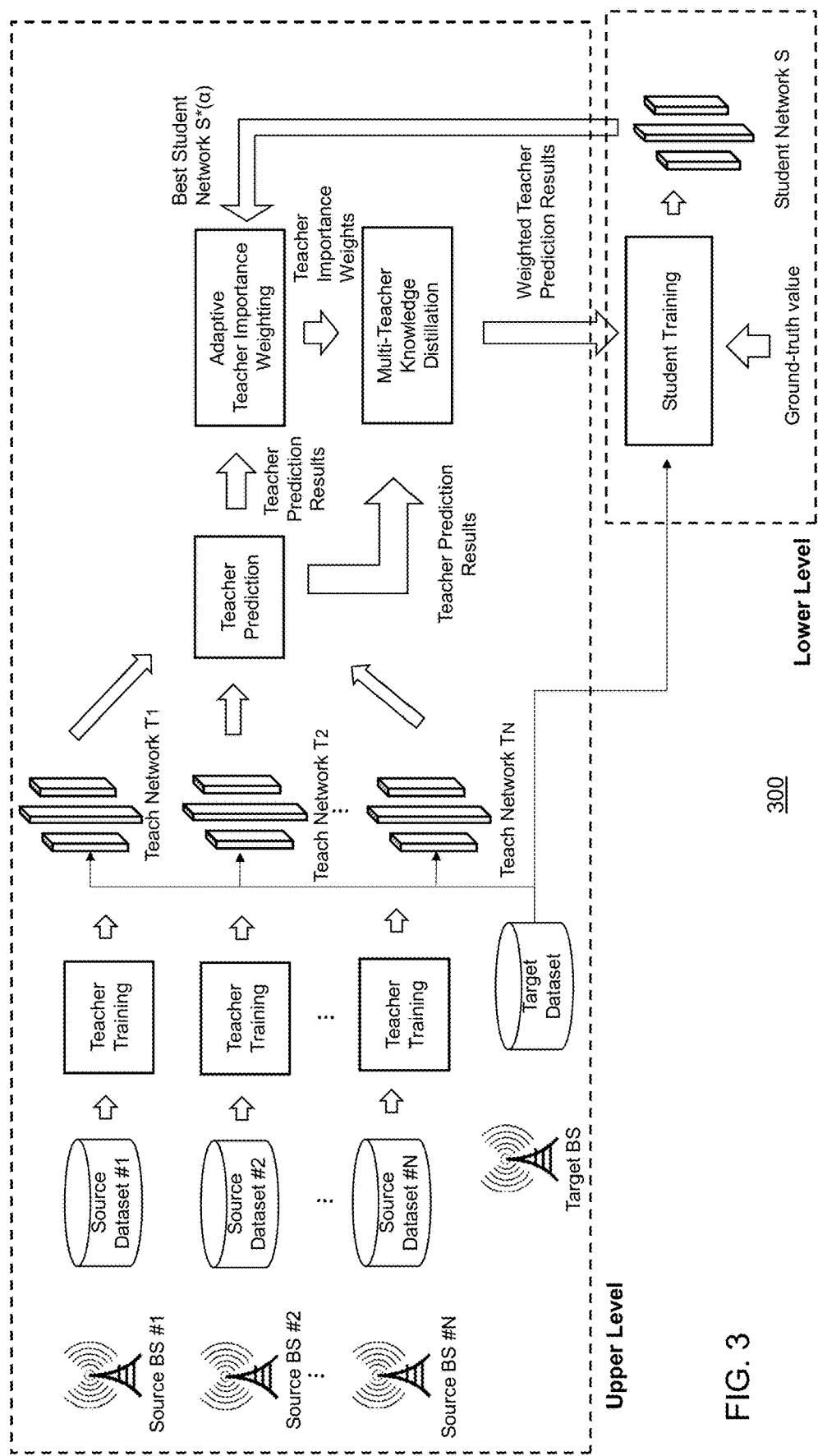
FIG. 3 is a diagram illustrating a system for training a student network to predict a future traffic load of a target base station according to embodiments.

FIG. 3 is a diagram illustrating a system 300 for training a student network to predict a future traffic load of a target base station according to embodiments.

The system 300 may include an upper level (i.e., a leader) and a lower level (i.e., a follower) to transfer knowledge from the upper level to the lower level. In particular, the system 300 may apply a knowledge distillation technology to exploit a hidden knowledge from extensive and robust teacher networks to guide the training of a shallow student network. Each teacher network is first trained on its own dataset in the upper level, and then the whole trained teacher networks are employed to conduct a prediction based on a training data set of a target base station in the lower level. The student network is trained to not only predict the ground-truth on the training data set, but also to match the predicted outputs from teacher networks.

More specifically, the upper level is provided to train a plurality of teacher networks $T_1$-$T_N$ based on a plurality of source data sets (e.g., Source Dataset #1-#N) collected from a plurality of source base stations (e.g., Source BS #1-#N), and obtain teacher prediction results from the plurality of teacher networks $T_1$-$T_N$ by inputting a target data set collected from a target base station (e.g., Target BS) to the plurality of teacher networks $T_1$-$T_N$.

In the upper level, an initial set of teacher importance weights is applied to the teacher prediction results to obtain a weighted sum of the teacher prediction results based on the initial set of teacher importance weights. For example, teacher importance weights $\omega_0$ of all the teacher networks may be initialized to be identical, that is $\omega_0=1/N$, wherein N is the number of the teacher networks.

The upper level provides the target data set and the weighted sum of the teacher prediction results to the lower level.

In the lower level, the student network is trained based on the target data set, the weighted sum of the teacher prediction results, and a ground-truth traffic load of the target base station. In particular, the lower level may compute a distillation loss between the weighted sum of the teacher prediction results and the prediction result of the student network, and a ground-truth loss between the prediction result of the student network and a ground-truth traffic load of the target base station, and may train the student network by minimizing or converging a combined loss of the distillation loss and the ground-truth loss via a gradient descent method. For example, the student network is iteratively updated until the combined loss converges into a constant value or reduces to a preset threshold (e.g., a value in a range from 0 to 0.1). A mean absolute error (MAE) or a mean square error (MSE) between the weighted sum of the teacher prediction results and the prediction result of the student network, and between the prediction result of the student network and the ground-truth traffic load of the target base station may be computed as the distillation loss and the ground-truth loss, respectively.

The updated student network is provided from the lower level to the upper level. The upper level may compute a teacher loss between a prediction result of the updated student network and the weighted sum of the teacher predictions result, and adjust the teacher importance weights to minimize or converge the teacher loss.

In the system 300, each of the teacher networks $T_1$-$T_N$ may be built with five hidden layers, which include 512, 256, 128, 64, and 32 hidden neurons, respectively. The student network may be built with a smaller size than the teacher networks, which includes one hidden layer with 128 neurons. However, the structures of the teacher networks $T_1$-$T_N$ and the student network are not limited thereto. For example, the teacher networks $T_1$-$T_N$ and the student network may have the same network structure (e.g., the same number of layers and neurons, and the same connections between the layers, and between the neurons) while having different network parameters.

For example, when there are N teacher networks T with teacher importance weights $\omega$, a student network S with network parameters $\alpha$, a training data set $D_{train}$ with M samples that are collected from the target base station, and a validation data set $D_{validation}$ with V samples that are collected from the target base station, the student loss $L_{stu}^{train}(\omega, \alpha)$ of the student network on the training data set $D_{train}$ is computed as follows:

$$L_{stu}^{train}(\omega, \alpha) = L_{KD} + L_{GT} \quad \text{Equation (1)}$$

$$L_{KD} = \frac{1}{M} \sum_{j=1}^{M} \left( \sum_{i=1}^{N} \omega_i T_{ij} - S_j(\alpha) \right)^2 \quad \text{Equation (2)}$$

$$L_{GT} = \frac{1}{M} \sum_{j=1}^{M} (Y_j - S_j(\alpha))^2 \quad \text{Equation (3)}$$

$L_{stu}^{train}(\omega, \alpha)$ represents the student loss of the student network S when a set of teacher importance weights $\omega$ is given to integrate prediction results of the teacher networks T, and network parameters $\alpha$ are provided to configure the student network S. $L_{KD}$ and $L_{GT}$ denote the distillation loss and the ground-truth loss. $\omega_i$ denotes a teacher importance weight of an i-th teacher network $T_i$, and $T_{ij}$ denotes a prediction result of the i-th teacher network $T_i$ for a j-th sample. $S_j(\alpha)$ and $Y_j$ denote a prediction result of the student network and a ground-truth traffic load for the j-th sample.

An optimal teacher importance weight for each teacher network is adaptively learned toward a knowledge distillation process, via a gradient-based bi-level optimization algorithm. The bi-level optimization algorithm is used to find optimal teacher importance weights with respect to a teacher loss $L_{tea}^{valid}(\omega, S^*(\alpha))$ on a validation data set $D_{valid}$, wherein $\omega$ denotes teacher importance weights, $S^*(\alpha)$ denotes the best student network that is obtained by minimizing or converging the student loss $L_{stu}^{train}(\omega, \alpha)$ on a training data set $D_{train}$, and $\alpha$ denotes network parameters of the student network.

The optimizations of student network parameters and teacher importance weights are represented as the lower level (i.e., the follower) and the upper level (i.e., the leader), respectively. Specifically, the bi-level optimization may be performed based on the following Equations (4) and (5):

$$\min_{\omega} L_{tea}^{valid}(\omega, S^*(\alpha)) \quad \text{Equation (4)}$$

$$\text{s.t. } S^*(\alpha) = \operatorname{argmin}_{\alpha} L_{stu}^{train}(\omega, \alpha) \quad \text{Equation (5)}$$

Where $L_{stu}^{train}(\omega, \alpha)$ is minimized on $D_{train}$ to obtain the best student network $S^*(\alpha)$ in the lower level optimization. With the feedback $S^*(\alpha)$ from the lower level, the knowledge distillation loss on the validation data set $D_{valid}$ with V samples is utilized as the teacher loss $L_{tea}^{valid}(\omega, S^*(\alpha))$ in the upper level optimization. The teacher loss $L_{tea}^{valid}(\omega, S^*(\alpha))$ may be computed as follows:

$$L_{tea}^{valid}(\omega, S^*(\alpha)) = \frac{1}{V} \sum_{j=1}^{V} \left( \sum_{i=1}^{N} \omega_i T_{ij} - S_j^*(\alpha) \right)^2 \quad \text{Equation (6)}$$

The teacher loss $L_{tea}^{valid}(\omega, S^*(\alpha))$ is minimized to find the optimal teacher importance weights, using for example, a gradient descent method.

The teacher importance weights of all teacher networks are initialized to be identical, so that initialized teacher importance weights $\omega_0 = 1/N$ when N is the number of the teacher network. Given the initialized teacher weights $\omega_0$, the initial student network parameters $\alpha_0$ are updated to minimize or converge the student loss $L_{stu}^{train}(\omega_0, \alpha_0)$ as follows:

$$\alpha_1 = \alpha_0 - \eta \nabla_{\alpha_0} L_{stu}^{train}(\omega_0, \alpha_0) \quad \text{Equation (7)}$$

wherein $\eta$ denotes a learning rate for the lower level optimization, and $\alpha_1$ denotes updated student network parameters.

After the updated student network parameters $\alpha_1$ are obtained, the best student network $S^*(\alpha_1)$ is utilized to learn the teacher importance weights $\omega_1$ in the upper level optimization. A one-step gradient descent is applied to update the teacher importance weights $\omega_0$ with respect to the teacher loss $L_{tea}^{valid}(\omega_0, S^*(\alpha_1))$ as follows:

$$\omega_1 = \operatorname{Norm}\left( \frac{\omega_0 - \gamma \nabla_{\omega_0} L_{tea}^{valid}(\omega_0, S^*(\alpha_1))}{\tau} \right) \quad \text{Equation (8)}$$

wherein $\gamma$ denotes a learning rate for the upper level optimization, and $\tau$ is a temperature parameter. Norm(•) is a normalization factor to ensure a sum of the updated teacher importance weights $\omega_1$ to be equal to one.

According to an embodiment of the present disclosure, pseudo code for an algorithm for training the student network is provided as follows.

---

Algorithm 1: Student Training with Multi-teacher KD via MuDiBO

1: Require: Student training set $D_{train}$, a student network $S(\alpha)$, N teacher networks, teacher importance weight $\omega$, training iterations Q.

| Algorithm 1: Student Training with Multi-teacher KD via MuDiBO |
| --- |

| 2: | Initialization: |
|---|---|
| 3: | Student network parameters $\alpha_0$. |
| 4: | Teacher training: |
| 5: | for i = 1, ..., N do |
| 6: | Train a teacher network $T_i$ on its own dataset; |
| 7: | end for |
| 8: | Student training with Multi-teacher KD: |
| 9: | while not coverage do |
| 10: | for t = 0, 1, ..., Q do |
| 11: | Calculate the predicted results from the trained teacher networks on $D_{train}$: |
| 12: | Integrate these predicted results according to $\omega_t$; |
| 13: | Calculate the predicted result from $S(\alpha_t)$ on $D_{train}$; |
| 14: | Calculate the student loss on $D_{train}$: |
| 15: | $L_{stu}^{train}(\omega_t, \alpha_t) = L_{KD} + L_{GT}$; |
| 16: | Calculate the gradient $\nabla_{\alpha_t} L_{stu}^{train}(\omega_t, \alpha_t)$ and update the student network parameters: |
| 17: | $\alpha_{t+1} = \alpha_t - \eta \nabla_{\alpha_t} L_{stu}^{train}(\omega_t, \alpha_t)$; |
| 18: | Obtain the best student network $S^*(\alpha_{t+1})$; |
| 19: | Optimize $\omega_t$ according to Alg. 2; |
| 20: | end for |
| 21: | end while |
| 22: | Return: The whole trained student network and teacher networks. |

According to an embodiment of the present disclosure, pseudo code for an algorithm for adaptively optimizing teacher importance weights is provided as follows.

| Algorithm 2: Adaptive Teacher Weighting Optimization via MuDiBO |
| --- |

| 1: | Require: Student validation set $D_{valid}$ with V samples, best student network $S^*(\alpha)$, N trained teacher networks, teacher importance weight $\omega$, training iterations Q. |
|---|---|
| 2: | Initialization: |
| 3: | Teacher importance weight $\omega_0 = 1/N$. |
| 4: | Teacher importance weight optimization: |
| 5: | while not converge do |
| 6: | for t = 0, 1, ..., Q do |
| 7: | Calculate the predicted result from $S^*(\alpha_{t+1})$ on $D_{valid}$; |
| 8: | Calculate the predicted results from the trained teacher networks on $D_{valid}$; |
| 9: | Integrate these predicted results according to $\omega_t$; |
| 10: | Calculate the teacher loss on $D_{valid}$: |
| 11: | $L_{tea}^{valid}(\omega_t, S^*(\alpha_{t+1})) = \frac{1}{V}\sum_{j=1}^{V}\left(\sum_{i=1}^{N}\omega_{ti}T_{ij} - S_j^*(\alpha_{t+1})\right)^2$; |
| 12: | Calculate the gradient $\nabla_{\omega_t} L_{tea}^{valid}(\omega_t, S^*(\alpha_{t+1}))$ and update the teacher importance weights: |
| 13: | $\omega_{t+1} = \text{Norm}\left(\frac{\omega_t - \gamma \nabla_{\omega_t} L_{tea}^{valid}(\omega_t, S^*(\alpha_{t+1}))}{\tau}\right)$ |
| 14: | Train the student network according to Alg. 1; |
| 15: | end for |
| 16: | end while |
| 17: | Return: The optimal teacher importance weights. |

The training of the student network may be performed based on multi-teacher knowledge distillation as shown in Algorithm 1. The bi-level optimization may be performed via an iterative process as shown in Algorithm 2.

Specifically, at the $t^{th}$ training iteration, the student network parameters $\alpha_{t+1}$ may be computed based on the student loss $L_{stu}^{train}(\omega_t, \alpha_t)$ on the training data set $D_{train}$ as follows:

$$\alpha_{t+1} = \alpha_t - \eta \nabla_{\alpha_t} L_{stu}^{train}(\omega_t, \alpha_t) \quad \text{Equation (9)}$$

Once the best student network $S^*(\alpha_{t+1})$ is obtained at the $(t+1)^{th}$ iteration, the teacher importance weights $\omega_{t+1}$ are determined by minimizing or converging the teacher loss $L_{tea}^{valid}(\omega_0, S^*(\alpha_{t+1}))$ on the validation data set $D_{valid}$ as follows:

$$\omega_{t+1} = \text{Norm}\left(\frac{\omega_t - \gamma \nabla_{\omega_t} L_{tea}^{valid}(\omega_t, S^*(\alpha_{t+1}))}{\tau}\right) \quad \text{Equation (10)}$$

Figure 4:
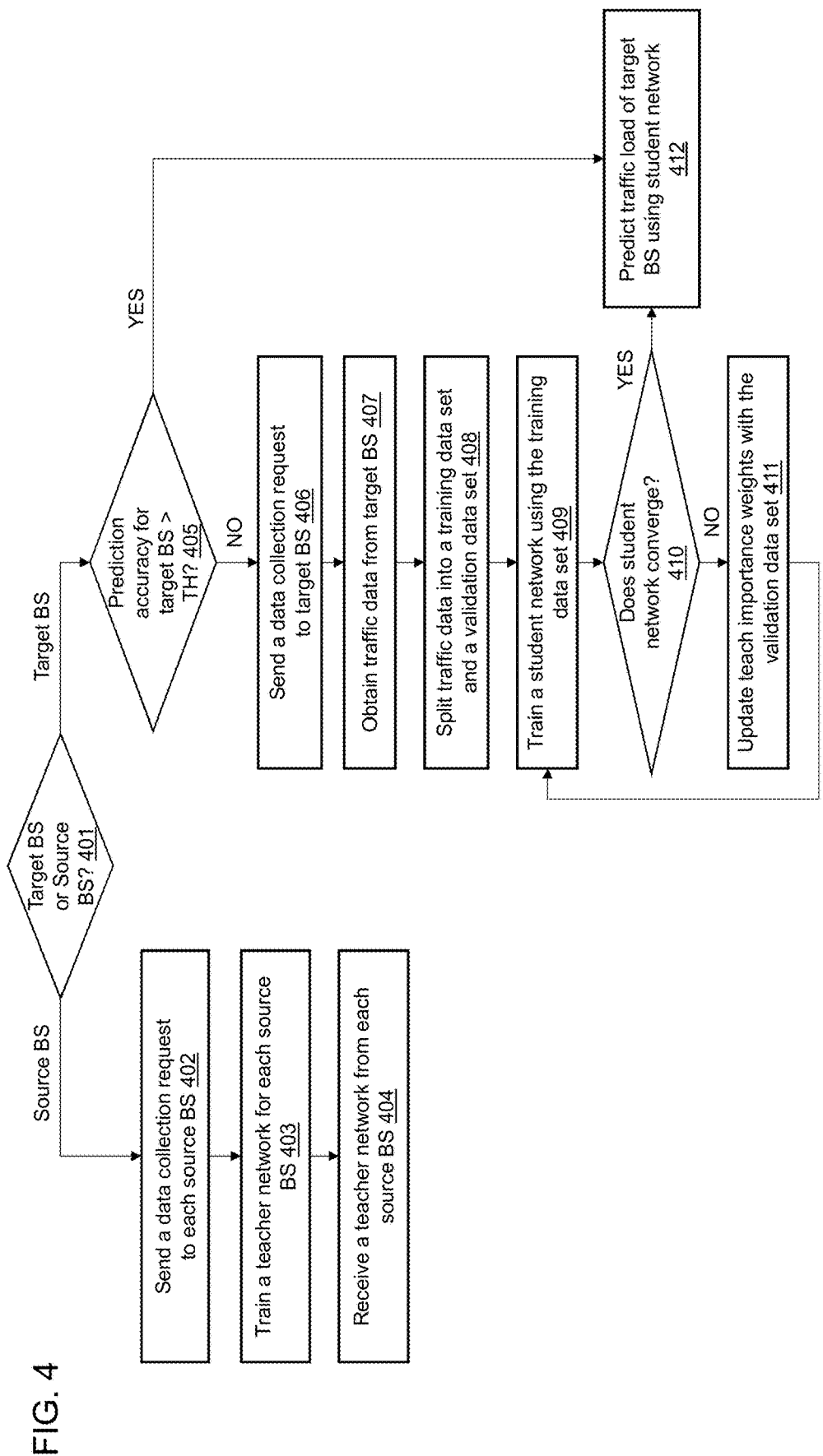
FIG. 4 is a flowchart illustrating an overall process of training a student network to predict a future traffic load of a target base station according to embodiments.

FIG. 4 is a flowchart illustrating an overall process of training a student network to predict a future traffic load of a target base station according to embodiments.

In operation 401, a server may determine whether a base station that is selected for a future traffic load prediction is a target base station or a source base station. If the selected base station is a source base station, operation 401 proceeds to operation 402.

In operation 402, a data collection request may be transmitted from the server to the source base station, so that the source base station collects its own local traffic data in response to the data collection request.

In operation 403, a teacher network for the source base station may be trained using the traffic data collected by the source base station.

In operation 404, the trained teacher network may be transmitted from the source base station to the server.

Operations 402-404 may be performed for each of a plurality of source base stations in sequence or in parallel.

Referring back to operation 401, when the selected base station is a target base station, operation 401 proceeds to operation 405.

In operation 405, it is determined whether a prediction accuracy of a student network is greater than a preset minimum performance TH. The prediction accuracy of the student network may be computed based on a ground-truth loss between a prediction result of the student network and a ground-truth traffic load of the target base station, and also based on a distillation loss between a weighted sum of teacher prediction results and the prediction result of the student network (if teacher networks are provided).

If the prediction accuracy of the student network is greater than the preset minimum performance TH, operation 405 proceeds to operation 412 to predict a future traffic load of the target base station using the student network. Otherwise, operation 405 proceeds to operation 406.

In operation 406, a data collection request is transmitted from the server to the target base station, as an initial stage for training the student network, so that the target base station collects traffic data in response to the data collection request.

In operation 407, the server may obtain the traffic data from the target base station, and in operation 408, may split the traffic data into a training data set and a validation data set.

In operation 409, the server may train the student network using the training data set, and in operation 410, the server may determine whether a prediction performance of the student network converges. In particular, the server may determine that the prediction performance of the student network converges when a student loss that includes the distillation loss and the ground-truth loss reaches a constant value. Operation 409 is described in further detail with reference to FIG. 5.

If the prediction performance of the student network converges, operation 410 proceeds to operation 412 to complete the training process and to predict the future traffic load of the target base station via the trained student network.

If the prediction performance of the student network does not converge, operation 410 proceeds to operation 411.

In operation 411, the server may adjust or update the teacher importance weights based on the validation data set, and then may proceed to operation 409 to further train the student network using the training data set and the teacher importance weights, until the prediction performance of the student network converges in operation 410. Operation 411 is described in further detail with reference to FIG. 6.

Figure 5:
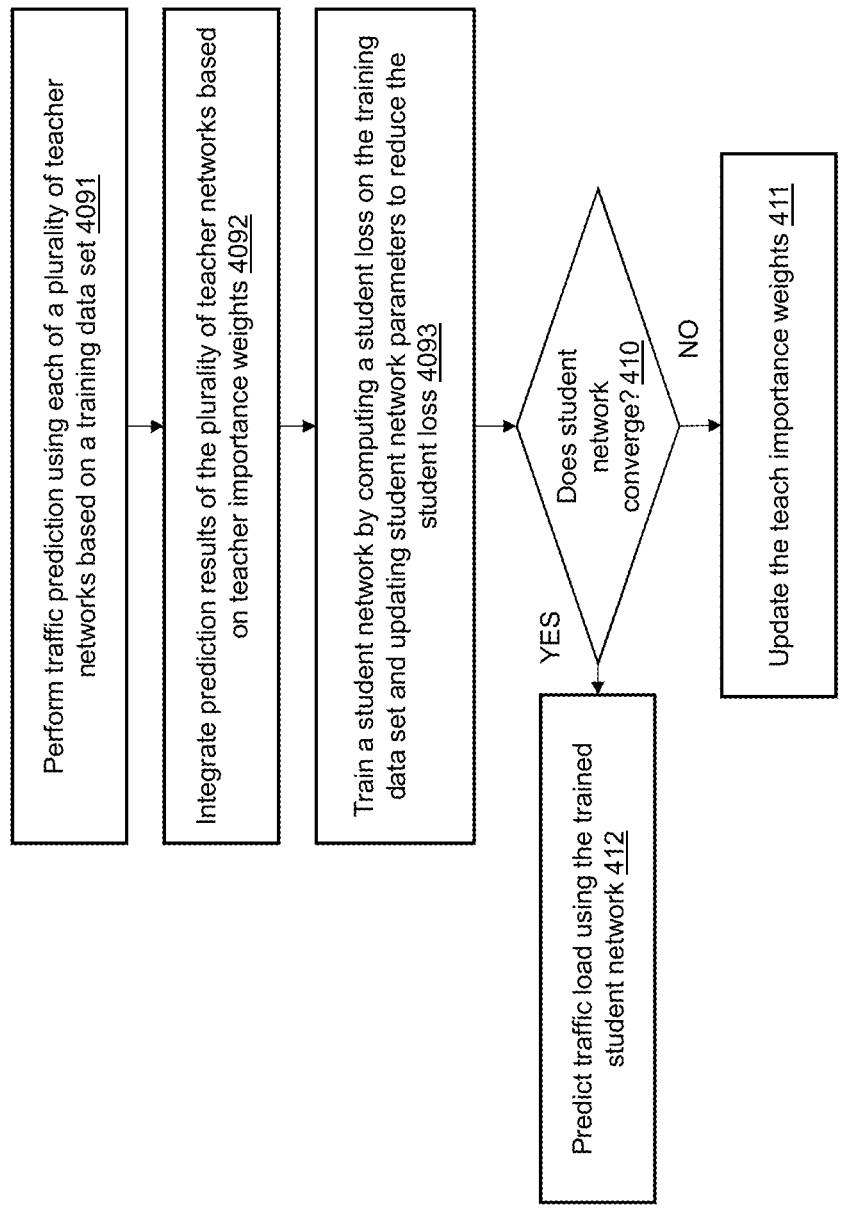
FIG. 5 is a flowchart illustrating a method of training a student network based on teacher importance weights according to embodiments.

FIG. 5 is a flowchart illustrating a method of training a student network based on teacher importance weights according to embodiments. In an embodiment, operation 409 in FIG. 4 may include operations 4091-4093 in FIG. 5.

In operation 4091, the server may perform traffic prediction using each of the plurality of teacher networks based on the training data set.

In operation 4092, the server may integrate traffic prediction results of plurality of teacher networks based on an initial set of teacher importance weights.

In operation 4093, the server may train the student network by computing a student loss including a distillation loss between a weighted sum of teacher prediction results and a prediction result of the student network, and a ground-truth loss between the prediction result of the student network and a ground-truth traffic load of the target base station, and updating network parameters of the student network to minimize the student loss, for example, to reduce the student loss to a preset minimum threshold, or to reduce the student loss until the student loss reaches a constant value (i.e., until the student loss does not reduce any longer).

In operation 410, the server may determine that the prediction performance of the student network converges when the student loss has reached the present minimum threshold or the student loss does not reduce any longer (i.e., the student loss has a constant value), and may predict the future traffic load of the target base station using the trained student network in operation 412.

In operation 410, when the server may determine that the prediction performance of the student network does not converge, the server may update the teacher importance weights in operation 411. Operation 411 is further described in FIG. 6.

Figure 6:
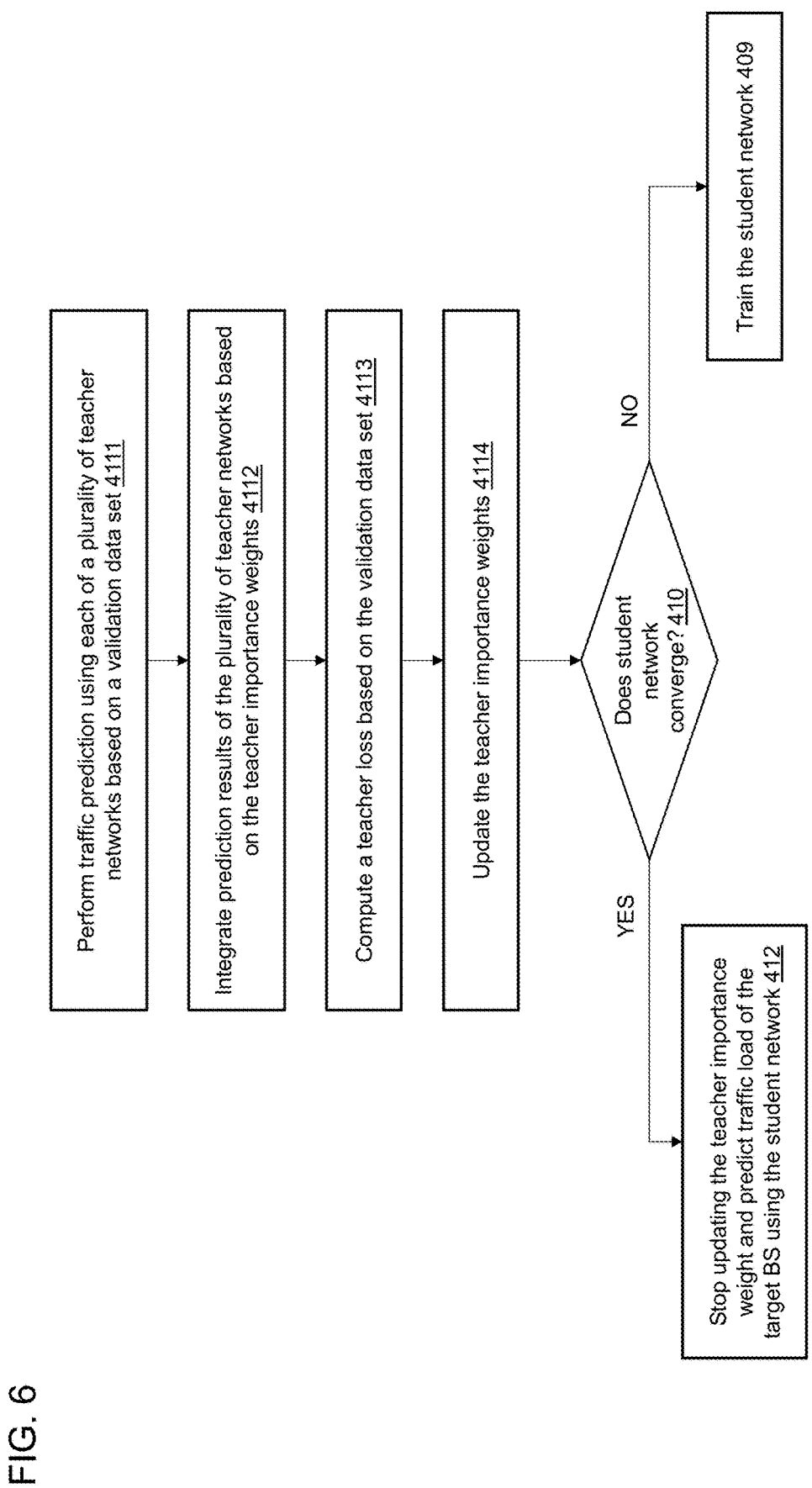
FIG. 6 is a flowchart illustrating a method of optimizing teacher importance weights according to embodiments.

FIG. 6 is a flowchart illustrating a method of optimizing teacher importance weights according to embodiments. In an embodiment, operation 411 in FIGS. 4 and 5 may include operations 4111-4114 in FIG. 6.

In operation 4111, the server may perform a traffic load prediction using each of the plurality of teacher networks based on a validation data set that is collected from the target base station. Each of the plurality of teacher networks is trained using their own local traffic data. The server may feed the validation data set into each of the trained teacher networks, and may obtain from each of the trained teacher networks, a teacher's prediction on a future traffic load of the target base station. The teacher's predictions from the teacher networks are distilled into the student network to improve the accuracy of the student's prediction on a future traffic load of the target base station, via operations 4112-4114.

In operation 4112, the server may integrate the teacher predictions based on an initial set of teacher importance weights, and may provide the integrated teacher predictions to the student network.

In operation 4113, the server may compute a teacher loss of the plurality of teacher networks based on the validation data set. The teacher loss may represent a distillation loss on the validation data set, and may be obtained by computing a difference between the integrated teacher predictions and the student prediction on the validation data set, for example using equation (6).

In operation 4114, the server may update the previously applied teacher importance weights by minimizing or converging the teacher loss via a gradient descent method, for example, using equation (7).

In operation 410, the server may determine whether the student network converges based on the teacher predictions that are integrated using the updated teacher importance weights.

When the server determines that the student network converges in operation 410, the server may predict the future traffic load of the target base station using the converged student network in operation 412. Otherwise, the server proceeds to operation 409 to continue to train the student network.

Figure 7:
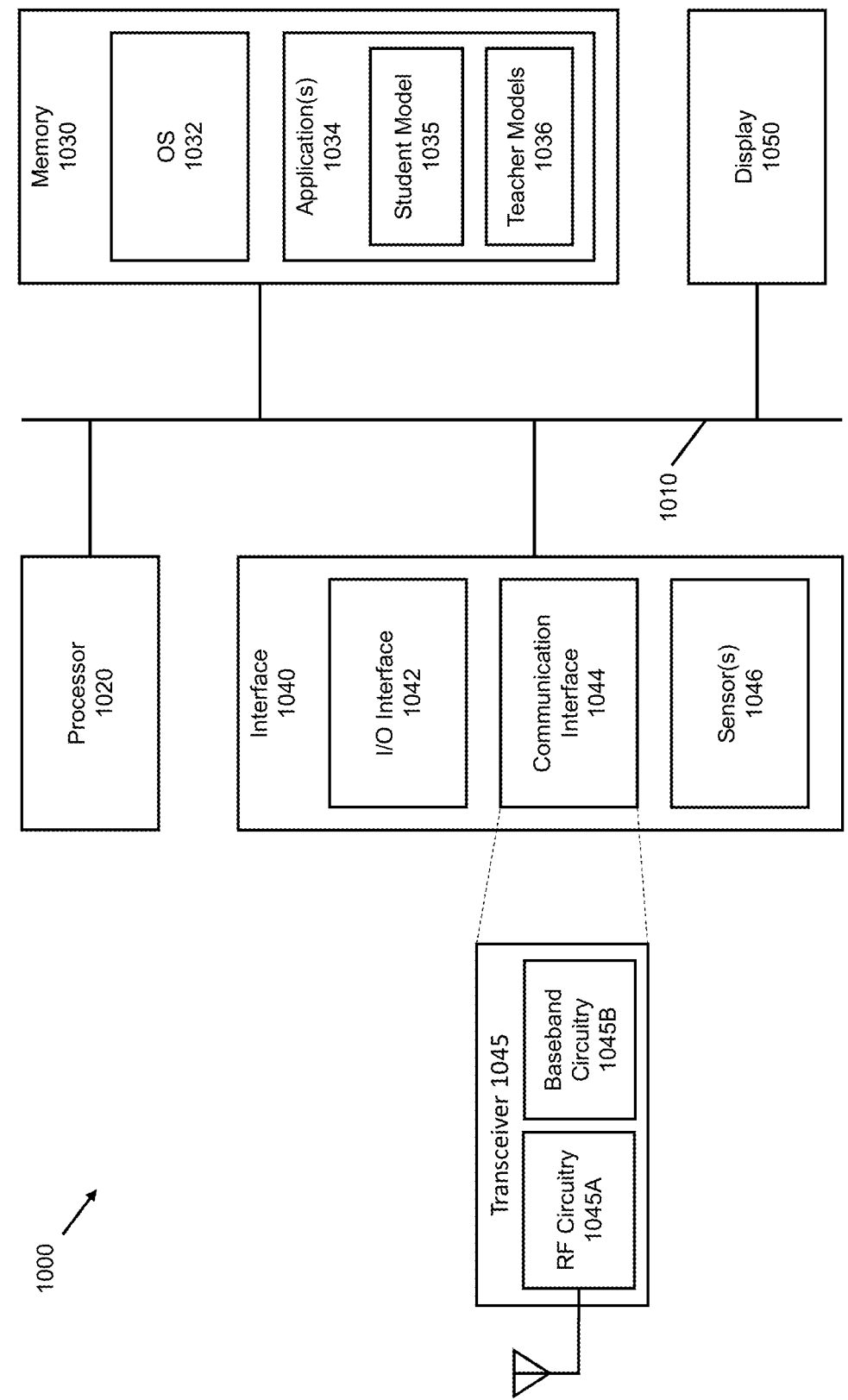
FIG. 7 is a block diagram of an electronic device according to embodiments.

FIG. 7 is a block diagram of an electronic device 1000 according to embodiments.

FIG. 7 is for illustration only, and other embodiments of the electronic device 1000 could be used without departing from the scope of this disclosure. For example, the electronic device 1000 may correspond to the server 120.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1000, and/or perform an operation or data processing relating to communication. For example, the processor 1020 performs operations 204, 208, 209, and 210 illustrated in FIG. 2, and operations 401-412, operations 4091-4093, and operations 411-4114 in FIGS. 4-6. The processor 1020 executes one or more programs stored in the memory 1030.

The memory 1030 may include a volatile and/or non-volatile memory. The memory 1030 stores information, such as one or more of commands, data, programs (one or more instructions), applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020.

In particular, the memory 1030 stores data, computer-readable instructions, applications, and setting information for the operation of base stations of the communication system 111. The memory 1030 may store information on a bearer allocated to an accessed UE and a measurement result reported from the accessed UE.

The applications 1034 include the above-discussed embodiments. These functions can be performed by a single application or by multiple applications that each carry out one or more of these functions. For example, the applications 1034 may include artificial intelligence (AI) models for performing operations 204, 208, 209,and 210 illustrated in FIG. 2, and operations 401-412, operations 4091-4093, and operations 411-4114 in FIGS. 4-6. Specifically, the applications 1034 may include a student model configured to form and operate a student network, and teacher models configured to form and operate teacher networks according to embodiment of the disclosure.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the electronic device 1000.

The communication interface 1044 may include a transceiver 1045 to enable communication between the electronic device 1000 and other external devices (e.g., a target base station, a plurality of source base stations, and other servers that store teacher networks), via a wired connection, a wireless connection, or a combination of wired and wireless connections. The communication interface 1044 may permit the electronic device 1000 to receive information from another device and/or provide information to another device. For example, the communication interface 1044 may include an Ethernet interface, an optical interface, a coaxial interface, an infrared interface, a radio frequency (RF) interface, a universal serial bus (USB) interface, a Wi-Fi interface, a cellular network interface, or the like.

The transceiver 1045 of the communication interface 1044 may include a radio frequency (RF) circuitry 1045A and a baseband circuitry 1045B.

The baseband circuitry 1045B may transmit and receive a signal through a wireless channel, and may perform band conversion and amplification on the signal. The RF circuitry 1045A may up-convert a baseband signal provided from the baseband circuitry 1045B into an RF band signal and then transmits the converted signal through an antenna, and down-converts an RF band signal received through the antenna into a baseband signal. For example, the RF circuitry 1045A may include a transmission filter, a reception filter, an amplifier, a mixer, an oscillator, a digital-to-analog converter (DAC), and an analog-to-digital converter (ADC).

The transceiver 1045 may be connected to one or more antennas. The RF circuitry 1045A of the transceiver 1045 may include a plurality of RF chains and may perform beamforming. For the beamforming, the RF circuitry 1045A may control a phase and a size of each of the signals transmitted and received through a plurality of antennas or antenna elements. The RF circuitry 1045A may perform a downlink multi-input and multi-output (MIMO) operation by transmitting one or more layers.

The baseband circuitry 1045A may perform conversion between a baseband signal and a bitstream according to a physical layer standard of the radio access technology. For example, when data is transmitted, the baseband circuitry 1045B generates complex symbols by encoding and modulating a transmission bitstream. When data is received, the baseband circuitry 1045B reconstructs a reception bitstream by demodulating and decoding a baseband signal provided from the RF circuitry 1045A.

The sensor(s) 1046 of the interface 1040 can meter a physical quantity or detect an activation state of the electronic device 1000 and convert metered or detected information into an electrical signal. For example, the sensor(s) 1046 can include one or more cameras or other imaging sensors for capturing images of scenes. The sensor(s) 1046 can also include any one or any combination of a microphone, a keyboard, a mouse, and one or more buttons for touch input. The sensor(s) 1046 can further include an inertial measurement unit. In addition, the sensor(s) 1046 can include a control circuit for controlling at least one of the sensors included herein. Any of these sensor(s) 1046 can be located within or coupled to the electronic device 1000.

Referring back to the processor 1020, the processor 1020 may transmit and receive signals through the RF circuitry 1045A and the baseband circuitry 1045B. The processor 1020 may record data (e.g., target traffic data, source traffic data, and teacher networks) in the memory 1030 and read the data from the memory 1030.

For example, when the electronic device 1000 corresponds to the server 120, the processor 1020 may receive from the communication system 111, traffic data, such as information about a number of active UEs that are served by each cell of the base stations, a cell load ratio, and an internet protocol (IP) throughput per cell, and may store the information of the number of active UEs, the cell load ratio, and the PI throughput per cell, in the memory 1020. The processor 1020 may control the transceiver 1045 to transmit a request for traffic data to the communication system 111, and to receive from the server 120 the information of the number of active UEs, the cell load ratio, and the IP throughput per cell, in response to the request from the traffic data. The processor 1020 may perform operations 401-412 based on the communication system state information, and may transmit a forecasted communication traffic load of a target base station (e.g., a target base station $BS_T$ illustrated in FIG. 1) or a forecasted communication traffic load of each of a plurality of cells of the target base station to the communication system 111. The communication system 111 may allocate communication bandwidth or UEs to the plurality of base stations of the communication system 111 or to the plurality of cells of the target base station, according to the forecasted communication traffic load, so that traffic loads are distributed relatively evenly among the plurality of base stations, and/or among the plurality of cells of the target base station.

Figure 8:
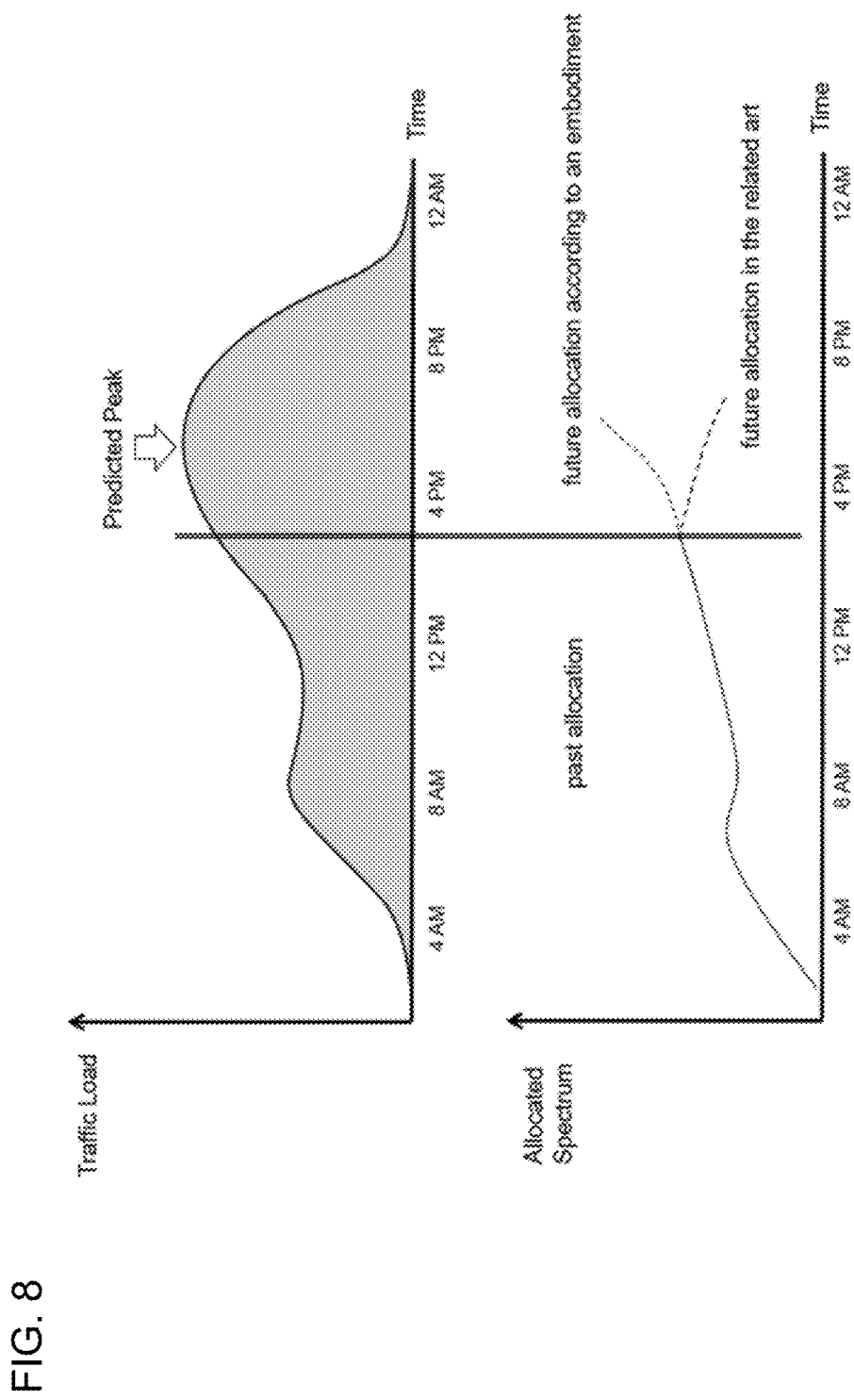
FIG. 8 illustrates a use application in which a server allocates a communication spectrum according to a predicted traffic load.

FIG. 8 illustrates a use application in which a server allocates a communication spectrum according to a predicted traffic load.

According to embodiments of the disclosure, a future traffic load of a target base station is predicted at a high accuracy via effective knowledge distillation from teacher networks. Based on the future traffic load of the target base station, a server may adjust a communication spectrum allocated to the target base station. For example, when the server predicts a peak traffic load between 4 PM and 8 PM, the server may increase the communication spectrum allocated to the target base station between the 4 PM and 8 PM.

Figure 9:
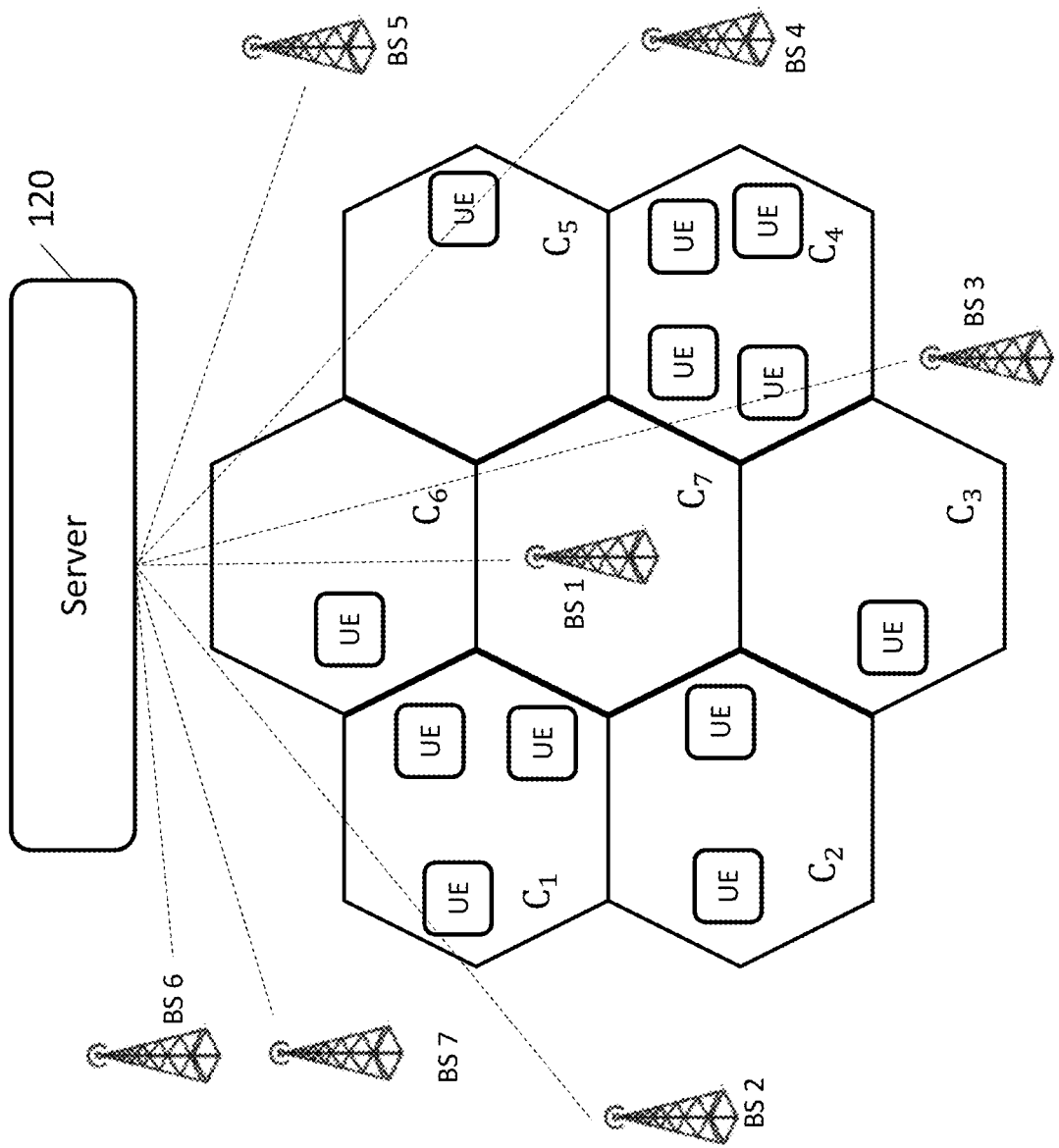
FIG. 9 illustrates a use application in which a server performs traffic load balancing between different communication cells, according to embodiments.

FIG. 9 illustrates a use application in which a server performs traffic load balancing between different communication cells, according to embodiments.

FIG. 9 illustrates a use application in which a server 120 performs traffic load balancing between different communication cells, according to embodiments.

Referring to FIG. 9, a system for performing traffic load balancing according to an example embodiment includes a server 120, a plurality of base stations BS1-BS7 each of which serves a plurality of cells having different cell reselection priorities, and a plurality of UEs that are respectively served in the plurality of cells. Among the plurality of base stations BS1-BS7, BS1 is the target base station, and the rest of base stations BS2-BS7 are source base stations.

In an example embodiment, the target base station BS1 may serve a plurality of cells $C_1$-$C_7$ having different frequency bands $f_1$-$f_7$ and different cell reselection priorities.

The server 120 may communicate with the plurality of base stations BS1-BS7 to receive information about the state of the UEs in their serving cells, for example, whether the UEs are in an idle mode or an active mode, the number of active UEs, and an internet protocol (IP) throughput of each cell.

The server 120 may determine a cell reselection priority for each of the plurality of cells $C_1$-$C_7$ of the target base station BS1 based on a forecasted communication traffic load of the target base station BS1 that is predicted via operations 401-412. The communication traffic load may be predicted using communication system state information received from the plurality of base stations BS1-BS7. The server 120 may transmit the cell reselection priorities to the target base station BS1. The target base station BS1 may forward the cell reselection priorities to the plurality of UEs so that some of the plurality of UEs are reassigned to another cell to distribute traffic load among the plurality of cells C1-C7.

Figure 10:
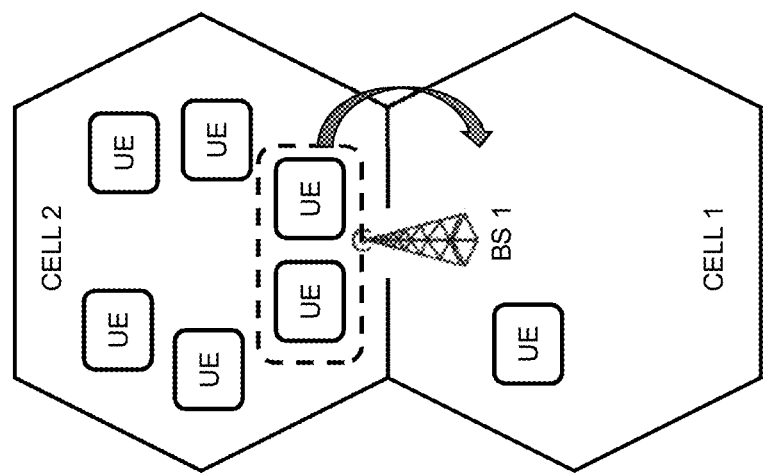
FIG. 10 illustrates a cell reselection process according to embodiments.

FIG. 10 illustrates a cell reselection process according to an example embodiment.

As shown in FIG. 10, a communication system includes at least one base station (BS), a communication network, and a plurality of user equipment (UEs) that access the communication network through the at least one BS.

The at least one BS may correspond to an Evolved Node B (eNB), a Next Generation Node B (gNB), a 6G Node. The BS may collect status information of the UEs and may provide the UEs with access to the communication network based on the status information. Examples of the status information may include information of whether the UEs are in an active mode or an idle mode, and may also include a buffer status, an available transmission power status, and a channel status of each of the UEs.

The communication system provides a first cell Cell 1 and a second cell Cell 2, that are served by a target base station BS1. For example, when six (6) UEs are connected to Cell 1 and one (1) cell is connected to Cell 2, one or more UEs among the six UEs in Cell 2 are reassigned to Cell 1 to distribute communication traffic load between Cell 1 and Cell 2.

Specifically, in an LTE, a 5G system, or a 6G system, the target base station BS1 may determine a cell reselection priority for each cell Cell 1 and Cell 2 to which the UEs should connect, through a radio resource control releasing message. The UEs may determine a target call on which to camp based on the cell reselection priority. For each UE, the cell reselection process is performed as a probabilistic process based on the cell reselection priority. When Cell 1 has a high cell reselection priority, a given idle mode UE may have a high probability of being reselected to camp on Cell 1. The communication system may shift idle UEs from overloaded Cell 2 to less loaded Cell 1.

Figure 11:
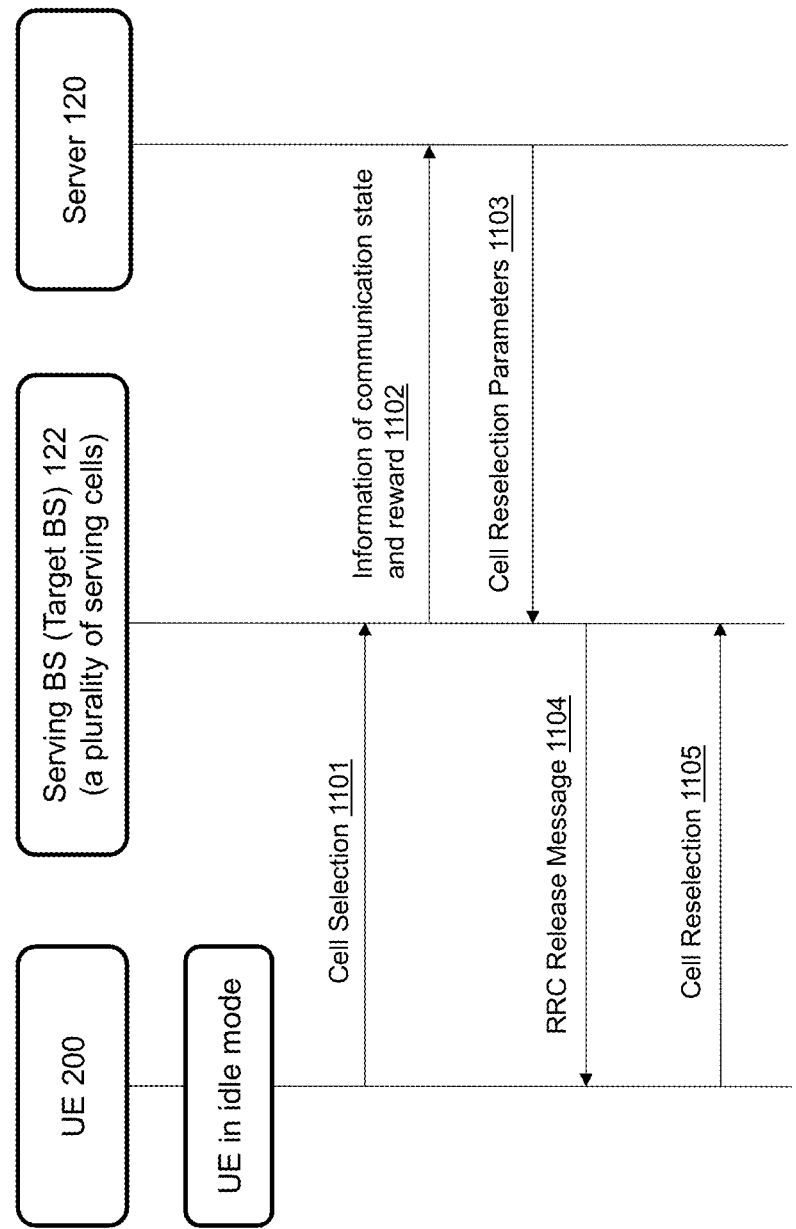
FIG. 11 illustrates a method of communicating with a user equipment (UE) and a base station (BS) to perform a cell reselection process according to embodiments.

FIG. 11 illustrates a method of communicating with a UE and a BS to perform a cell reselection process according to an example embodiment.

As shown in FIG. 11, the UE 200 in an idle mode may perform an initial cell selection in operation 1101. In order to select an initial cell, the UE 200 may scan all radio frequency (RF) channels in its operating frequency bands and may select an initial cell for the UE to camp on, based on cell selection criterion. For example, the UE 200 may select the initial cell based on various parameters, such as for example, a cell selection reception (RX) level value (Srxlev), a cell selection quality value (Squal), an offset temporarily applied to a cell (Qoffsettemp), a measured cell reception level value (Qqualmeas), a measured cell quality value (Qrxlevmeas), a minimum required RX level in the cell (Qrxlevmin), a minimum required quality level in the cell (Qqualmin). The UE 200 transmits information of the selected initial cell to a base station 122 that manages a plurality of cells, so that the UE 200 in the idle mode camps on the selected initial cell among the plurality of cells.

In operation 1102, the base station 122 may transmit traffic data, including the number of active mode UEs per cell, the cell load ratio, and the IP throughput per cell, to the server 120.

In operation 1103, the server 120 may determine cell reselection parameters based on a traffic load that is predicted by the student network in operation 210 or 412, and may transmit the cell reselection parameters to the base station 122. The cell reselection parameters may correspond to cell reselection priorities that are assigned to the plurality of cells $C_1$-$C_7$ shown in FIG. 9.

In operation 1104, the base station 122 may transmit a Radio Resource Control (RRC) Release message including the cell reselection parameters, to the UE 200.

In operation 1105, the UE 200 then may select a target cell to camp on based on the cell reselection parameters, and may send information of the selected target cell to the base station 122. For example, when a second cell $C_2$ has a higher cell reselection priority than the other neighboring cells, $C_1$ and $C_3$-$C_7$, among the plurality of cells $C_1$-$C_7$, the idle mode UE 200 has a higher probability of being re-assigned to camp on the second cell $C_2$ than other neighboring cells, $C_1$ and $C_3$-$C_7$.

Figure 12:
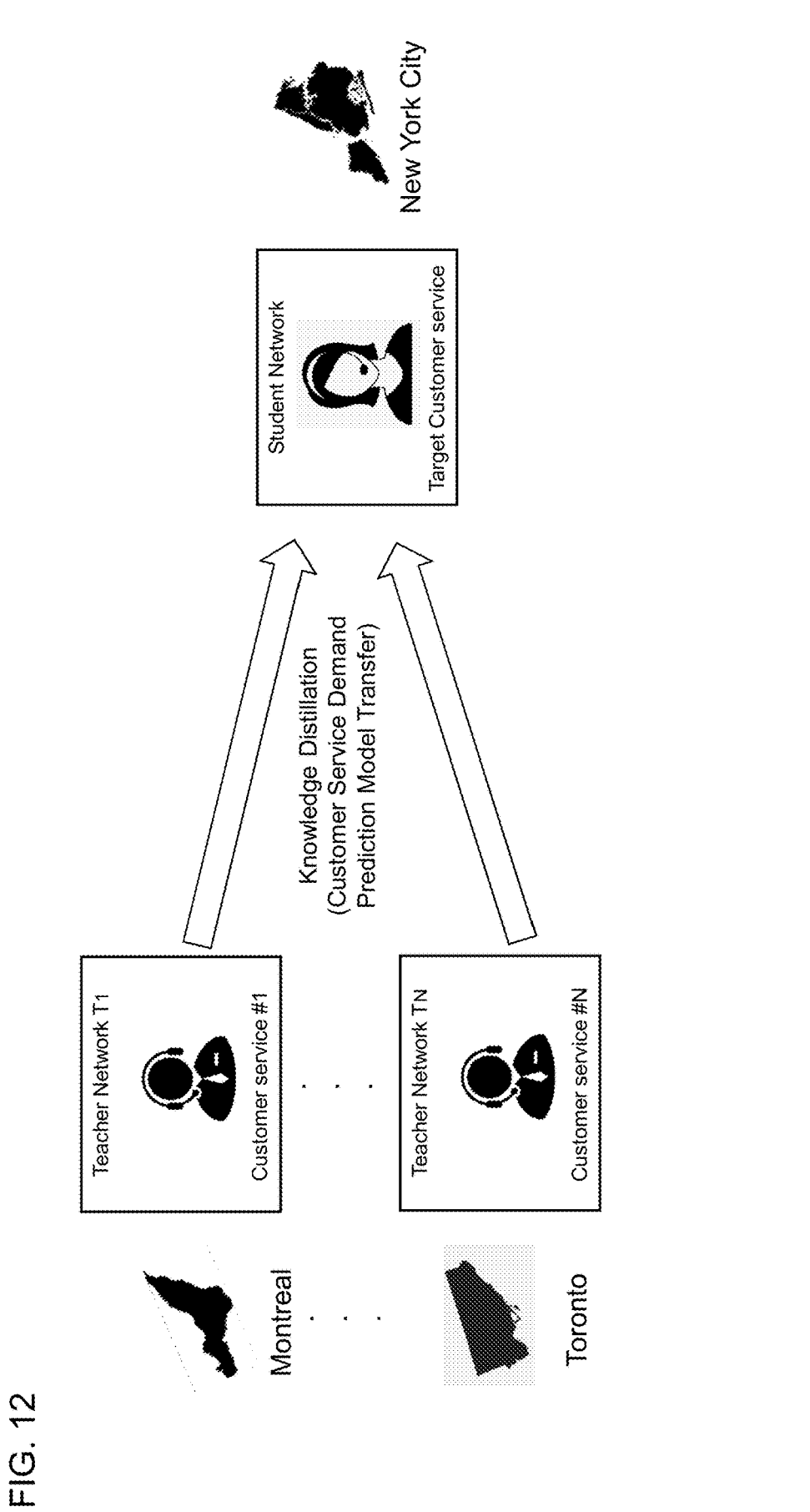
FIG. 12 illustrates a use application for predicting a customer service center demand at a target location, according to embodiments.

FIG. 12 illustrates a use application in which a customer service center demand at a target location (e.g., New York city) is forecasted using a student network that is trained based on knowledge distilled from teacher networks $T_1$-$T_N$. The teacher networks $T_1$-$T_N$ may be trained using data of customer service demands (e.g., a number of customer calls and/or a number of customer messages for a given time period, a time duration of each customer call, a time required to respond to each customer email) that are collected by customer service centers at their local locations (e.g., Montreal and Toronto).

The student network may be trained in the same or substantially the same manner as illustrated in FIGS. 3-6, but using different input data (i.e., historic data of customer service demands) and providing different prediction data (i.e., a prediction of a future customer service demand, such as a predicted consumer call volume, and a predict customer message volume).

The forecasting method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 100, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The forecasting method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the server.

The foregoing disclosure provides illustration and description, but is not intended to be exhaustive or to limit the implementation to the precise form disclosed. Modifications and variations are possible in light of the above disclosure or may be acquired from practice of the implementation.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 1000, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the electronic device 1000.

A model related to the neural networks described above may be implemented via a software module. When the model is implemented via a software module (for example, a program module including instructions), the model may be stored in a computer-readable recording medium.

Also, the model may be a part of the electronic device 1000 described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. A server for predicting future load, the server comprising:
    at least one memory storing computer-readable instructions; and
    at least one processor configured to execute the computer-readable instructions to:
        obtain a plurality of teacher artificial intelligence (AI) models that are trained based on source traffic data from a plurality of source base stations;
        obtain target traffic data from a target base station;
        obtain an integrated teacher model based on the target traffic data and the plurality of teacher artificial intelligence (AI) models;
        obtain a student AI model that is trained based on the target traffic data;
        update the integrated teacher model based on a difference between a student prediction of the student AI model on the target traffic data, and an integrated teacher prediction of the integrated teacher model on the target traffic data;
        update the student AI model based on the updated integrated teacher model; and
        predict a communication traffic load of the target base station using the updated student AI model.

2. The server of claim 1, wherein the at least one processor is further configured to:

obtain the integrated teacher model based on the target traffic data and the plurality of teacher artificial intelligence (AI) models, by integrating teach prediction results of the plurality of teacher AI models based on teacher importance weights;

split the target traffic data into a training data set and a validation data set;

obtain a distillation knowledge loss and a ground-truth loss based on the training data set of the target traffic data;

obtain the student AI model that is trained to converge a student loss including the distillation knowledge loss and the ground-truth loss; and obtain the student prediction of the student AI model and the integrated teacher prediction of the integrated teacher model based on the validation data set of the target traffic data, to update the teacher importance weights.

3. The server of claim 1, wherein the at least one processor is further configured to:

obtain the integrated teacher model based on the target traffic data and the plurality of teacher artificial intelligence (AI) models, by integrating teach prediction results of the plurality of teacher AI models based on teacher importance weights;

update the integrated teacher model by updating the teacher importance weights based on the difference between the student prediction of the student AI model and the integrated teacher prediction of the integrated teacher model.

4. The server of claim 3, wherein the at least one processor is further configured to update the student AI model based on the integrated teacher model to which the updated teacher importance weights are applied.

5. The server of claim 1, wherein the at least one processor is further configured to:

compute a distillation knowledge loss of the student AI model based on the difference between the integrated teacher prediction and the student prediction of the student AI model on the target traffic data;

compute a ground-truth loss of the student AI model based on a difference between the student prediction of the student AI model on the target traffic data and a ground-truth traffic load; and obtain the student model that is trained to converge a student loss including the distillation knowledge loss and the ground-truth loss.

6. The server of claim 1, wherein the at least one processor is further configured to:

determine whether a prediction accuracy on a further traffic load of the target base station over a present past time window, is lower than an accuracy threshold; and in response to determining that the prediction accuracy is lower than the accuracy threshold, start to collect the target traffic data from the target base station, and train the student AI model based on the integrated teacher prediction of the integrated teacher model.

7. The server of claim 1, wherein the at least one processor is further configured to:

split the target traffic data into a training data set and a validation data set; and at each iteration, update teacher importance weights to be applied to combine the plurality of teacher models of the integrated teacher model, and the student AI model, via gradient descent to minimize a teacher loss of the integrated teacher model on the validation data set and a student loss of the student AI model on the training data set, respectively.

8. The server of claim 1, wherein the at least one processor is further configured to:

adjust a spectrum allocated to the target base station based on the predicted communication traffic load of the target base station.

9. A method for predicting future load, the method comprising:

obtaining a plurality of teacher artificial intelligence (AI) models that are trained based on source traffic data from a plurality of source base stations;

obtaining target traffic data from a target base station;

obtaining an integrated teacher model based on the target traffic data and the plurality of teacher artificial intelligence (AI) models;

obtaining a student AI model that is trained based on the target traffic data;

updating the integrated teacher model based on a difference between a student prediction of the student AI model on the target traffic data, and an integrated teacher prediction of the integrated teacher model;

updating the student AI model based on the updated integrated teacher model; and predicting a communication traffic load of the target base station using the updated student AI model.

10. The method of claim 9, further comprising:

obtaining the integrated teacher model based on the target traffic data and the plurality of teacher artificial intelligence (AI) models, by integrating teach prediction results of the plurality of teacher AI models based on teacher importance weights;

splitting the target traffic data into a training data set and a validation data set;

obtaining a distillation knowledge loss and a ground-truth loss based on the training data set of the target traffic data;

obtaining the student AI model that is trained to converge a student loss including the distillation knowledge loss and the ground-truth loss; and obtaining the student prediction of the student AI model and the integrated teacher prediction of the integrated teacher model based on the validation data set of the target traffic data, to update the teacher importance weights.

11. The method of claim 9, further comprising:

obtaining the integrated teacher model based on the target traffic data and the plurality of teacher artificial intelligence (AI) models, by integrating teach prediction results of the plurality of teacher AI models based on teacher importance weights;

updating the integrated teacher model by updating the teacher importance weights based on the difference between the student prediction of the student AI model and the integrated teacher prediction of the integrated teacher model.

12. The method of claim 11, further comprising:

updating the student AI model based on the integrated teacher model to which the updated teacher importance weights are applied.

13. The method of claim 9, further comprising:

computing a distillation knowledge loss of the student AI model based on the difference between the integrated teacher prediction and the student prediction of the student AI model on the target traffic data;

computing a ground-truth loss of the student AI model based on a difference between the student prediction of the student AI model on the target traffic data and a ground-truth traffic load; and obtaining the student model that is trained to converge a student loss including the distillation knowledge loss and the ground-truth loss.

14. The method of claim 9, further comprising:

determining whether a prediction accuracy on a further traffic load of the target base station over a present past time window, is lower than an accuracy threshold; and in response to determining that the prediction accuracy is lower than the accuracy threshold, starting to collect the target traffic data from the target base station, and train the student AI model based on the integrated teacher prediction of the integrated teacher model.

15. The method of claim 9, further comprising:

splitting the target traffic data into a training data set and a validation data set; and at each iteration, updating teacher importance weights to be applied to combine the plurality of teacher models of the integrated teacher model, and the student AI model, via gradient descent to minimize a teacher loss of the integrated teacher model on the validation data set and a student loss of the student AI model on the training data set, respectively.

16. The method of claim 9, further comprising:

adjusting a spectrum allocated to the target base station based on the predicted communication traffic load of the target base station.

17. A non-transitory computer-readable storage medium storing instructions which, when executed by at least one processor, causes the at least one processor to perform a method for predicting future load:

obtaining a plurality of teacher artificial intelligence (AI) models that are trained based on source traffic data from a plurality of source base stations;

obtaining target traffic data from a target base station;

obtaining an integrated teacher model based on the target traffic data and the plurality of teacher artificial intelligence (AI) models;

obtaining a student AI model that is trained based on the target traffic data;

updating the integrated teacher model based on a difference between a student prediction of the student AI model on the target traffic data, and an integrated teacher prediction of the integrated teacher model AI models on the target traffic data;

updating the student AI model based on the updated integrated teacher model; and predicting a communication traffic load of the target base station using the updated student AI model.

18. The non-transitory computer-readable storage medium of claim 17, wherein the method further comprises:

computing a distillation knowledge loss of the student AI model based on a difference between the integrated teacher prediction and the student prediction of the student AI model on the target traffic data;

computing a ground-truth loss of the student AI model based on a difference between the student prediction of the student AI model on the target traffic data and a ground-truth traffic load; and obtaining the student model that is trained to converge a student loss including the distillation knowledge loss and the ground-truth loss.

19. The non-transitory computer-readable storage medium of claim 17, wherein the method further comprises:

splitting the target traffic data into a training data set and a validation data set;

at each iteration, updating teacher importance weights to be applied to combine the plurality of teacher models of the integrated teacher model, and the student AI model via gradient descent to minimize a teacher loss of the integrated teacher model on the validation data set and a student loss of the student AI mode on the training data set, respectively, and adjusting a spectrum allocated to the target base station based on the predicted communication traffic load of the target base station.

20. The non-transitory computer-readable storage medium of claim 17, wherein the method further comprises:

obtaining the integrated teacher model based on the target traffic data and the plurality of teacher artificial intelligence (AI) models, by integrating teach prediction results of the plurality of teacher AI models based on teacher importance weights;

splitting the target traffic data into a training data set and a validation data set;

obtaining a distillation knowledge loss and a ground-truth loss based on the training data set of the target traffic data;

obtaining the student AI model that is trained to converge a student loss including the distillation knowledge loss and the ground-truth loss; and obtaining the student prediction of the student AI model and the integrated teacher prediction of the integrated teacher model based on the validation data set of the target traffic data, to update the teacher importance weights.

* * * * *